US010469516B2

(12) United States Patent
Hampel et al.

(10) Patent No.: US 10,469,516 B2
(45) Date of Patent: Nov. 5, 2019

(54) TECHNIQUES FOR ASSOCIATING MEASUREMENT DATA ACQUIRED AT A WIRELESS COMMUNICATION DEVICE WITH CURRENT VALUES OF TIME AND LOCATION OBTAINED BY A USER EQUIPMENT AND ACKNOWLEDGED BY THE WIRELESS COMMUNICATION DEVICE

(71) Applicant: QUALCOMM Incorporated, San Diego, CA (US)

(72) Inventors: Karl Georg Hampel, New York, NY (US); Vincent Douglas Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/140,927

(22) Filed: Apr. 28, 2016

(65) Prior Publication Data

US 2017/0318047 A1 Nov. 2, 2017

(51) Int. Cl.
*H04L 29/06* (2006.01)
*H04W 4/02* (2018.01)
(Continued)

(52) U.S. Cl.
CPC ........ *H04L 63/1433* (2013.01); *H04L 43/065* (2013.01); *H04W 4/025* (2013.01);
(Continued)

(58) Field of Classification Search
CPC . H04L 63/1433; H04L 43/106; H04L 63/123; H04L 63/1466; H04W 4/025;
(Continued)

(56) References Cited

U.S. PATENT DOCUMENTS 5,919,239 A * 7/1999 Fraker ................... G01S 5/0027
340/573.1
7,123,924 B2 * 10/2006 Cuffaro ..................... G01S 5/02
455/456.1
(Continued)

FOREIGN PATENT DOCUMENTS

EP 2800403 A1 11/2014
EP 2988540 A1 2/2016

OTHER PUBLICATIONS

Huawei et al., "L2 UE-to-Network Relay for E-UTRAN," 3GPP TSG-RAN Meeting #71, RP-160415, Goteborg, Sweden, Mar. 7-10, 2016, 4 pgs., XP051076357, 3rd Generation Partnership Project.

(Continued)

*Primary Examiner* — Babar Sarwar
(74) *Attorney, Agent, or Firm* — Holland & Hart LLP

(57) ABSTRACT

Techniques are described for wireless communication. A method for wireless communication at a user equipment (UE) includes transmitting, to a wireless communication device, an indicator of current values of time and location obtained by the UE; receiving, from the wireless communication device, measurement data acquired at the wireless communication device and an acknowledgement of the indicator of the current values of time and location; and forwarding the measurement data and the acknowledgement of the indicator of the current values of time and location to a data collector. A method for wireless communication at a wireless communication device includes receiving, from a UE, an indicator of current values of time and location; and transmitting, to the UE, measurement data and an acknowledgement of the indicator of the current values of time and location.

51 Claims, 19 Drawing Sheets

(51) Int. Cl.
  *H04W 4/38* (2018.01)
  *H04W 4/70* (2018.01)
  *H04W 8/00* (2009.01)
  *H04L 12/26* (2006.01)
  *H04W 12/10* (2009.01)
  *H04W 12/12* (2009.01)
  *H04W 88/04* (2009.01)

(52) U.S. Cl.
  CPC .............. *H04W 4/38* (2018.02); *H04W 4/70* (2018.02); *H04W 8/005* (2013.01); *H04L 63/123* (2013.01); *H04L 63/1466* (2013.01); *H04W 12/10* (2013.01); *H04W 12/12* (2013.01); *H04W 88/04* (2013.01)

(58) Field of Classification Search
  CPC ....... H04W 12/10; H04W 12/12; H04W 4/02; H04W 4/38; H04W 4/70; H04W 88/04; H04W 8/005
  See application file for complete search history.

(56) References Cited

U.S. PATENT DOCUMENTS

| | | | | |
|---|---|---|---|---|
| 8,798,638 | B2* | 8/2014 | Lane | H04B 7/01 455/456.1 |
| 8,918,086 | B2* | 12/2014 | Thange | H04M 3/4228 455/414.1 |
| 9,247,461 | B2* | 1/2016 | Kondo | H04J 11/0069 |
| 9,357,368 | B2* | 5/2016 | Nelson | H04W 4/025 |
| 9,424,603 | B2* | 8/2016 | Hammad | G06Q 30/0639 |
| 9,467,830 | B2* | 10/2016 | Chung | H04W 4/16 |
| 9,491,588 | B1* | 11/2016 | Biehl | H04W 4/043 |
| 9,559,761 | B2* | 1/2017 | Luft | H04B 7/0456 |
| 9,602,999 | B2* | 3/2017 | Kim | H04W 4/023 |
| 9,668,165 | B2* | 5/2017 | Zhang | H04M 3/2236 |
| 2007/0086388 | A1* | 4/2007 | Kang | H04W 36/30 370/331 |
| 2008/0320354 | A1* | 12/2008 | Doppler | H04L 1/04 714/748 |
| 2009/0016295 | A1* | 1/2009 | Li | H04L 5/0007 370/330 |
| 2010/0190469 | A1* | 7/2010 | Vanderveen | H04L 12/14 455/406 |
| 2011/0167270 | A1* | 7/2011 | Lee | H04L 9/0869 713/170 |
| 2011/0195717 | A1* | 8/2011 | Kondo | H04J 11/0069 455/437 |
| 2011/0227726 | A1* | 9/2011 | Lee | G08B 21/0202 340/539.13 |
| 2012/0088487 | A1* | 4/2012 | Khan | H04W 4/021 455/418 |
| 2012/0202518 | A1* | 8/2012 | Lim | H04W 64/00 455/456.1 |
| 2012/0231828 | A1 | 9/2012 | Wang et al. | |
| 2013/0013181 | A1* | 1/2013 | Wang | G08G 1/096791 701/119 |
| 2013/0084809 | A1* | 4/2013 | Johansson | H04W 24/08 455/67.11 |
| 2013/0102335 | A1* | 4/2013 | Katagi | H04W 4/029 455/457 |
| 2014/0187259 | A1* | 7/2014 | Kakani | H04W 64/00 455/456.1 |
| 2014/0315496 | A1* | 10/2014 | Hamada | H04W 24/10 455/67.11 |
| 2014/0344269 | A1* | 11/2014 | Dong | H04L 67/12 707/736 |
| 2015/0133157 | A1* | 5/2015 | Xiao | G01S 5/06 455/456.1 |
| 2015/0195811 | A1* | 7/2015 | Wu | H04W 64/00 455/436 |
| 2015/0317809 | A1* | 11/2015 | Chellappan | H04W 4/90 455/404.1 |
| 2015/0382152 | A1* | 12/2015 | Lindskog | G01S 5/021 455/456.2 |
| 2016/0021169 | A1* | 1/2016 | Chan | H04L 67/04 709/217 |
| 2016/0022141 | A1 | 1/2016 | Mittal et al. | |
| 2016/0028605 | A1 | 1/2016 | Gil et al. | |
| 2016/0029160 | A1* | 1/2016 | Theurer | G16Z 99/00 455/456.1 |
| 2016/0044651 | A1* | 2/2016 | Lu | H04W 4/70 370/329 |
| 2016/0057565 | A1 | 2/2016 | Gold | |
| 2016/0087743 | A1* | 3/2016 | El Ayach | H04W 52/242 455/452.1 |
| 2016/0262043 | A1* | 9/2016 | Zhang | H04M 3/2236 |
| 2016/0295374 | A1* | 10/2016 | Persson | G01S 5/0036 |
| 2016/0364732 | A1* | 12/2016 | Jagatheesan | G06Q 30/016 |
| 2017/0142741 | A1* | 5/2017 | Kaur | H04W 56/002 |
| 2017/0208477 | A1* | 7/2017 | Hampel | H04W 16/14 |
| 2018/0137316 | A1* | 5/2018 | Fischer | G06K 19/071 |
| 2018/0146387 | A1* | 5/2018 | Hong | H04W 4/00 |
| 2018/0213379 | A1* | 7/2018 | Xiong | H04W 4/70 |

OTHER PUBLICATIONS

ISA/EP, International Search Report and Written Opinion of the International Searching Authority, Int'l Application No. PCT/US2017/024305, dated Jul. 18, 2017, European Patent Office, Rijswijk, NL, 17 pgs.

* cited by examiner

TECHNIQUES FOR ASSOCIATING MEASUREMENT DATA ACQUIRED AT A WIRELESS COMMUNICATION DEVICE WITH CURRENT VALUES OF TIME AND LOCATION OBTAINED BY A USER EQUIPMENT AND ACKNOWLEDGED BY THE WIRELESS COMMUNICATION DEVICE

BACKGROUND

Field of the Disclosure

The present disclosure, for example, relates to wireless communication systems, and more particularly to techniques for associating measurement data acquired at a wireless communication device with current values of time and location obtained by a user equipment (UE) and acknowledged by the wireless communication device.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations, wireless local area network (WLAN) access points, radio heads, etc.), each simultaneously supporting communication for multiple communication devices, otherwise known as UEs. A network access device may communicate with UEs on downlink channels (e.g., for transmissions from a network access device to a UE) and uplink channels (e.g., for transmissions from a UE to a network access device).

Some wireless communication devices (e.g., Internet of Things (IOT) devices) may have limited means to connect to a wireless communication system and may be unable to connect to a cellular network via a network access device (e.g., a base station, a WLAN access point, or a radio head). However, these wireless communication devices may be able to connect to a UE using, for example, a Bluetooth, Bluetooth Low Energy (BLE), ZigBee, Wi-Fi, Long Term Evolution Direct (LTE-D), 5G, or unlicensed spectrum interface.

SUMMARY

When a wireless communication device (e.g., an IOT device) has limited means to connect to a wireless communication system, but may be able to connect to a UE, the wireless communication device may leverage the community of UEs to forward (e.g., relay) information transmitted by the wireless communication device (e.g., measurement data) to a data collector connected to a network accessible to the UEs. The high densities of UEs in some environments, and the broad network coverage options available to some UEs, may provide wireless communication devices with a broad array of options for forwarding measurement data transmitted by the wireless communication devices to a data collector.

In some examples, a wireless communication device may rely on a UE to obtain current values of parameters that are unavailable at the wireless communication device (e.g., current values of time and location), and to forward an indicator of the current values to a data collector with the wireless communication device's measurement data. When the delivery of measurement data transmitted by a wireless communication device, to a data collector, is not time critical, a UE may receive the wireless communication device's measurement data, associate current values of time and location with the measurement data, cache the measurement data and current values of time and location, and forward the measurement data and an indicator of the current values of time and location to the data collector at a time determined by the UE (or upon entering a service area for a network connected to the data collector).

Because the UEs that receive and forward measurement data of a wireless communication device to a data collector do not have a trusted relationship with the wireless communication device, the transmission of measurement data by the wireless communication device is vulnerable to replay attacks. To mitigate the likelihood of replay attacks, a UE may be asked to transmit an indicator of current values of time and location to the wireless communication device, and to forward an acknowledgement of the indicator of the current values of time and location to a data collector (e.g., with the wireless communication device's measurement data). The acknowledgement may indicate to the data collector that the wireless communication device intentionally communicated with the UE.

The present disclosure describes techniques for associating measurement data acquired at a wireless communication device with current values of time and location obtained by a UE and acknowledged by the wireless communication device. In one example, a method for wireless communication at a UE is described. The method may include transmitting, to a wireless communication device, an indicator of current values of time and location obtained by the UE; receiving, from the wireless communication device, measurement data acquired at the wireless communication device and an acknowledgement of the indicator of the current values of time and location; and forwarding the measurement data and the acknowledgement of the indicator of the current values of time and location to a data collector.

In some examples of the method, the measurement data may be received before the indicator of the current values of time and location is transmitted, and the acknowledgement of the indicator of the current values of time and location may be received after the indicator of the current values of time and location is transmitted. In some examples, the indicator of the current values of time and location may be transmitted to the wireless communication device based at least in part on receiving the measurement data. In some examples, the measurement data and the acknowledgement of the indicator of the current values of time and location may be received after the indicator of the current values of time and location is transmitted. In some examples, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the transmitting and receiving may occur on a first wireless interface and the forwarding may occur on a second wireless interface.

In some examples, the method may include receiving a beacon from the wireless communication device, and the indicator of the current values of time and location may be transmitted based at least in part on receiving the beacon. In some examples, the method may include receiving, from the wireless communication device, a request for: the current values of time and location, or relaying services, or a combination thereof, and the indicator of the current values of time and location may be transmitted based at least in part on receiving the request. In some examples, the forwarding may further include forwarding, with the measurement data and the acknowledgement of the indicator of the current values of time and location, at least one of: the indicator of the current values of time and location, or the current values of time and location, or a second indicator of the current values of time and location. In some examples, the method may include obtaining the current values of time and location from: a first sensor of the UE, or a second sensor remote from both the UE and the wireless communication device, or a combination thereof. In some examples, the forwarding may occur: upon receiving the acknowledgement of the indicator of the current values of time and location, or upon entering a service area for a network connected to the data collector, or at a time determined by the UE, or at a combination thereof. In some examples, the measurement data may include: a sensor reading, or an identity of the wireless communication device, or a combination thereof.

In one example, an apparatus for wireless communication at a UE is described. The apparatus may include means for transmitting, to a wireless communication device, an indicator of current values of time and location obtained by the UE; means for receiving, from the wireless communication device, measurement data acquired at the wireless communication device and an acknowledgement of the indicator of the current values of time and location; and means for forwarding the measurement data and the acknowledgement of the indicator of the current values of time and location to a data collector.

In some examples of the apparatus, the measurement data may be received before the indicator of the current values of time and location is transmitted, and the acknowledgement of the indicator of the current values of time and location is received after the indicator of the current values of time and location is transmitted. In some examples, the indicator of the current values of time and location may be transmitted to the wireless communication device based at least in part on receiving the measurement data. In some examples, the measurement data and the acknowledgement of the indicator of the current values of time and location may be received after the indicator of the current values of time and location is transmitted. In some examples, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the transmitting and receiving may occur on a first wireless interface and the forwarding may occur on a second wireless interface.

In some examples, the apparatus may include means for receiving a beacon from the wireless communication device, and the indicator of the current values of time and location may be transmitted based at least in part on receiving the beacon. In some examples, the apparatus may include means for receiving, from the wireless communication device, a request for: the current values of time and location, or relaying services, or a combination thereof, and the indicator of the current values of time and location may be transmitted based at least in part on receiving the request. In some examples, the means for forwarding may further include means for forwarding, with the measurement data and the acknowledgement of the indicator of the current values of time and location, at least one of: the indicator of the current values of time and location, or the current values of time and location, or a second indicator of the current values of time and location. In some examples, the apparatus may include means for obtaining the current values of time and location from: a first sensor of the UE, or a second sensor remote from both the UE and the wireless communication device, or a combination thereof. In some examples, the forwarding may occur: upon receiving the acknowledgement of the indicator of the current values of time and location, or upon entering a service area for a network connected to the data collector, or at a time determined by the UE, or at a combination thereof. In some examples, the measurement data may include: a sensor reading, or an identity of the wireless communication device, or a combination thereof.

In one example, another apparatus for wireless communication at a UE is described. The apparatus may include a processor, and memory in electronic communication with the processor. The processor and the memory may be configured to transmit, to a wireless communication device, an indicator of current values of time and location obtained by the UE; to receive, from the wireless communication device, measurement data acquired at the wireless communication device and an acknowledgement of the indicator of the current values of time and location; and to forward the measurement data and the acknowledgement of the indicator of the current values of time and location to a data collector.

In some examples of the apparatus, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the transmitting and receiving may occur on a first wireless interface and the forwarding occurs on a second wireless interface. In some examples, the processor and the memory may be configured to receive a beacon from the wireless communication device, and the indicator of the current values of time and location may be transmitted based at least in part on receiving the beacon. In some examples, the processor and the memory may be configured to receive, from the wireless communication device, a request for: the current values of time and location, or relaying services, or a combination thereof, and the indicator of the current values of time and location may be transmitted based at least in part on receiving the request. In some examples, the processor and the memory may be configured to forward, with the measurement data and the acknowledgement of the indicator of the current values of time and location, at least one of: the indicator of the current values of time and location, or the current values of time and location, or a second indicator of the current values of time and location.

In one example, a non-transitory computer-readable medium storing computer-executable code for wireless communication at a UE is described. The code may be executable by a processor to transmit, to a wireless communication device, an indicator of current values of time and location obtained by the UE; to receive, from the wireless communication device, measurement data acquired at the wireless communication device and an acknowledgement of the indicator of the current values of time and location; and to forward the measurement data and the acknowledgement of the indicator of the current values of time and location to a data collector.

In some examples of the non-transitory computer-readable medium, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the code executable by the processor to forward the measurement data may include code executable by the processor to forward, with the measurement data and the acknowledgement of the indicator of the current values of time and location, at least one of: the indicator of the current values of time and location, or the current values of time and location, or a second indicator of the current values of time and location.

In one example, a method for wireless communication at a wireless communication device is described. The method may include receiving, from a UE, an indicator of current values of time and location; and transmitting, to the UE, measurement data and an acknowledgement of the indicator of the current values of time and location.

In some examples of the method, the measurement data may be transmitted before the indicator of the current values of time and location is received, and the acknowledgement of the indicator of the current values of time and location may be transmitted after the indicator of the current values of time and location is received. In some examples, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location.

In one example, an apparatus for wireless communication at a wireless communication device is described. The apparatus may include means for receiving, from a UE, an indicator of current values of time and location; and means for transmitting, to the UE, measurement data and an acknowledgement of the indicator of the current values of time and location.

In some examples of the apparatus, the measurement data may be transmitted before the indicator of the current values of time and location is received, and the acknowledgement of the indicator of the current values of time and location may be transmitted after the indicator of the current values of time and location is received. In some examples, the indicator of the current values of time and location may include: the current values of time and location, or a HASH over the current values of time and location, or a combination thereof. In some examples, the acknowledgement of the indicator of the current values of time and location may include: a binding of the indicator of the current values of time and location to the measurement data, or a signature of the indicator of the current values of time and location.

In one example, another apparatus for wireless communication at a wireless communication device is described. The apparatus may include a processor, and memory in electronic communication with the processor. The processor and the memory may be configured to receive, from a UE, an indicator of current values of time and location; and to transmit, to the UE, measurement data and an acknowledgement of the indicator of the current values of time and location.

In some examples of the apparatus, the measurement data may be transmitted before the indicator of the current values of time and location is received, and the acknowledgement of the indicator of the current values of time and location may be transmitted after the indicator of the current values of time and location is received. In some examples, the acknowledgement of the indicator of the current values of time and location may include: a binding of the indicator of the current values of time and location to the measurement data, or a signature of the indicator of the current values of time and location.

In one example, a non-transitory computer-readable medium storing computer-executable code for wireless communication at a wireless communication device is described. The code may be executable by a processor to receive, from a UE, an indicator of current values of time and location; and to transmit, to the UE, measurement data and an acknowledgement of the indicator of the current values of time and location.

In some examples of the non-transitory computer-readable medium, the measurement data may be transmitted before the indicator of the current values of time and location is received, and the acknowledgement of the indicator of the current values of time and location may be transmitted after the indicator of the current values of time and location is received. In some examples, the acknowledgement of the indicator of the current values of time and location may include: a binding of the indicator of the current values of time and location to the measurement data, or a signature of the indicator of the current values of time and location.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which measurement data acquired at a wireless communication device may be associated with current values of time and location obtained by a UE and acknowledged by the wireless communication device. Many IOT applications are based on time and/or location-sensitive measurement data. A tracking application, for instance, may collect data from sensors that are attached to items to be tracked, which sensors have wireless communication interfaces and periodically report a device's time and location. Environmental sensing applications, for instance, may rely on proper timestamping of measurement data reported by environmental sensors. In some cases, it may be prohibitively expensive to provide an IOT device with the capabilities to conduct on-board time and location measurements. In some cases, providing an IOT device with the capabilities to conduct on-board time and location measurements may increase the size or weight of the IOT device, or place too significant a drain on the IOT device's battery power. While it is possible for a data collector to associate data with a time of receipt, delays in the delivery of data to the data collector may cause the time of receipt to be non-representative of the time of data acquisition.

UEs such as smart phones (or more generically, smart devices) typically have capabilities to obtain time and location information. Smart phones with cellular capabilities, for instance, may obtain time information from a cellular network. Smart phones may also support geolocation features via a Global Navigation Satellite System (GNSS), which may provide a smart phone with location as well as time information. Location information may also be derived from the reception of beacon signals transmitted by Wi-Fi hotspots. Most smart phones further have a rather stable internal clock that provides sufficient time accuracy over extended time periods when a smart phone is outside cellular network or GNSS coverage.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
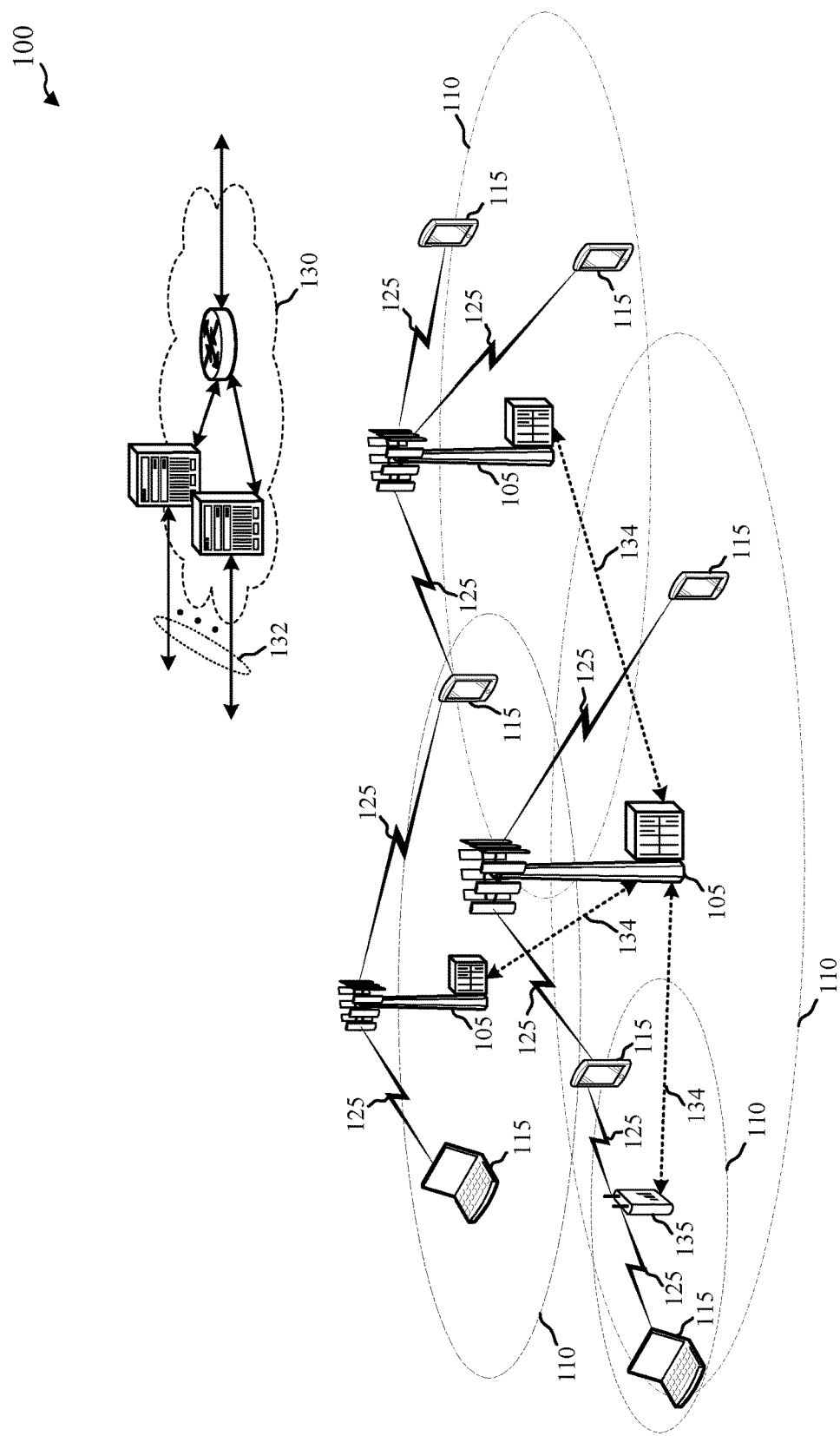
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include network access devices (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base stations. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE or LTE-Advanced (LTE-A) networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, etc. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a licensed spectrum (e.g., a spectrum licensed to particular users for particular uses) or an unlicensed spectrum (e.g., a spectrum that is available for Wi-Fi use, a spectrum that is available for use by different radio access technologies, or a spectrum that is available for use by multiple MNOs in an equally shared or prioritized manner).

Figure 2:
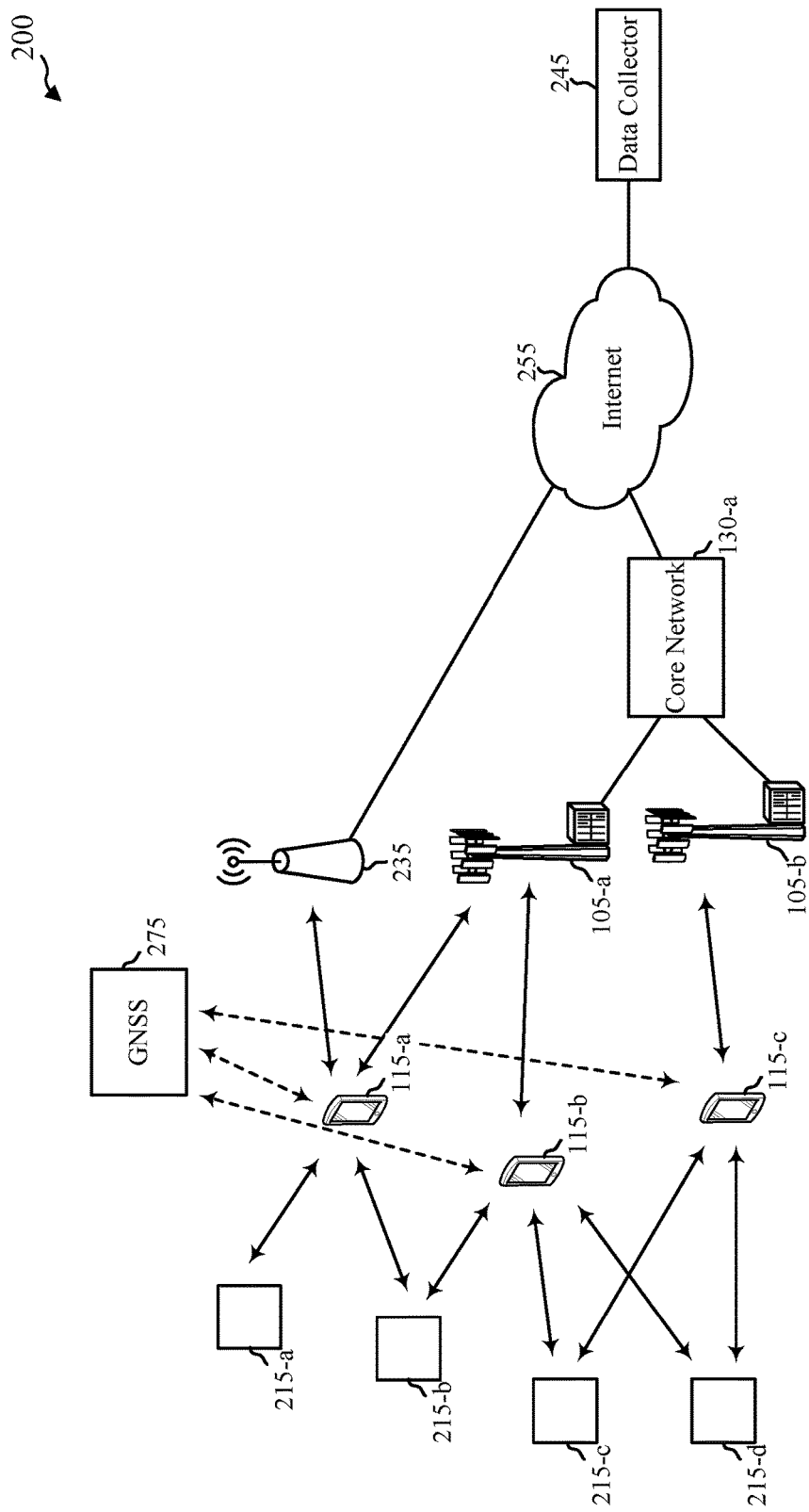
FIG. 2 illustrates an example of a wireless communication system, in accordance with various aspects of the present disclosure.

FIG. 2 illustrates an example of a wireless communication system 200, in accordance with various aspects of the present disclosure. The wireless communication system 200 may include wireless communication devices 215, UEs 115, network access devices (e.g., base stations 105 and a WLAN access point 235), a core network 130-a, and a data collector 245. The wireless communication system 200 may be an example of portions of the wireless communication system 100 described with reference to FIG. 1. Moreover, the UEs 115, base stations 105, and core network 130-a may be examples of aspects of the UEs 115, base stations 105, and core network 130 described with reference to FIG. 1.

The wireless communication devices 215 may include a first wireless communication device 215-a, a second wireless communication device 215-b, a third wireless communication device 215-c, and a fourth wireless communication device 215-d. The wireless communication devices 215 may include IOT devices (e.g., wearable devices (e.g., watches or monitoring devices), tracking devices, ID tags, household devices, monitoring devices, etc.) or other devices. The wireless communication devices 215 may include stationary or mobile devices. The UEs 115 may include a first UE 115-a, a second UE 115-b, and a third UE 115-c. The UEs 115 may include stationary or mobile devices.

The base stations 105 may include a first base station 105-a and a second base station 105-b. Each of the first base station 105-a and the second base station 105-b may communicate with a core network 130-a. The base stations 105 and WLAN access point 235 may be connected to a network 255 such as the Internet.

In some examples, the wireless communication devices 215 may include devices with limited processing or data acquisition capabilities. For example, a wireless communication device 215 may be able to sense a single parameter (or set of parameters), such as temperature or pressure. Also or alternatively, a wireless communication device 215 may monitor a single condition (or set of conditions). Also or alternatively, a wireless communication device 215 may be transmit an identifier of the wireless communication device 215, and in some cases, a wireless communication device 215 may not sense any parameter or condition and just transmit an identifier of the wireless communication device 215.

In some examples, the wireless communication devices 215 may include power-constrained devices with limited means to connect to a network (e.g., limited means to connect to Wi-Fi or cellular networks). In some examples, a wireless communication device's limited means to connect to a network may include a Bluetooth, BLE, ZigBee, Wi-Fi, LTE-D, 5G, or unlicensed spectrum interface. In some examples, a wireless communication device 215 may not have a modem capable of connecting to a cellular network.

The UEs 115 may connect to various network access devices (e.g., base stations, WLAN access points 235, or other network access devices (not shown)) as the UEs 115 move within the wireless communication system 200. The UEs 115 may also communicate with other devices and obtain services provided by the core network 130-a or data collector 245. The data collector may collect data (e.g., measurement data, identifiers, values of parameters, etc.) pertaining to the wireless communication devices 215.

As a UE 115 moves within communication range of a wireless communication device 215, the UE 115 may receive a beacon or request from wireless communication device 215 (or otherwise identify the existence of the wireless communication device 215) and establish a connection with the wireless communication device 215. The UE 115 may receive data from the wireless communication device 215, and may forward the received data to a data collector associated with the core network 130-a or a device (e.g., the device 265) connected to the network 255.

In some examples, a UE 115 may obtain current values of time and location and associate the current values of time and location, or an indicator of the current values of time and location, with data received from a wireless communication device 215. In some examples, a UE 115 may obtain the current values of time and location from at least a first sensor of the UE 115, or at least a second sensor (e.g., a GNSS 275) remote from both the UE 115 and a wireless communication device 215, or a combination thereof. In some examples, a UE 115 may transmit an indicator of current values of time and location to a wireless communication device 215, and the wireless communication device 215 may return an acknowledgement of the indicator of the current values of time and location to the UE 115. In some examples, the acknowledgement may be bound with measurement data of the wireless communication device 215. The UE 115 may then forward the measurement data and the acknowledgement of the indicator of the current values of time and location to a data collector via a network access device (e.g., a base station 105 or WLAN access point 235). In some examples, the UE 115 may forward the measurement data and the acknowledgement of the indicator of the current values of time and location to a data collector immediately. In other examples, the UE 115 may cache the measurement data and the acknowledgement of the indicator of the current values of time and location, and forward the measurement data and the acknowledgement of the indicator of the current values of time and location to a data collector at a later time.

Figure 3:
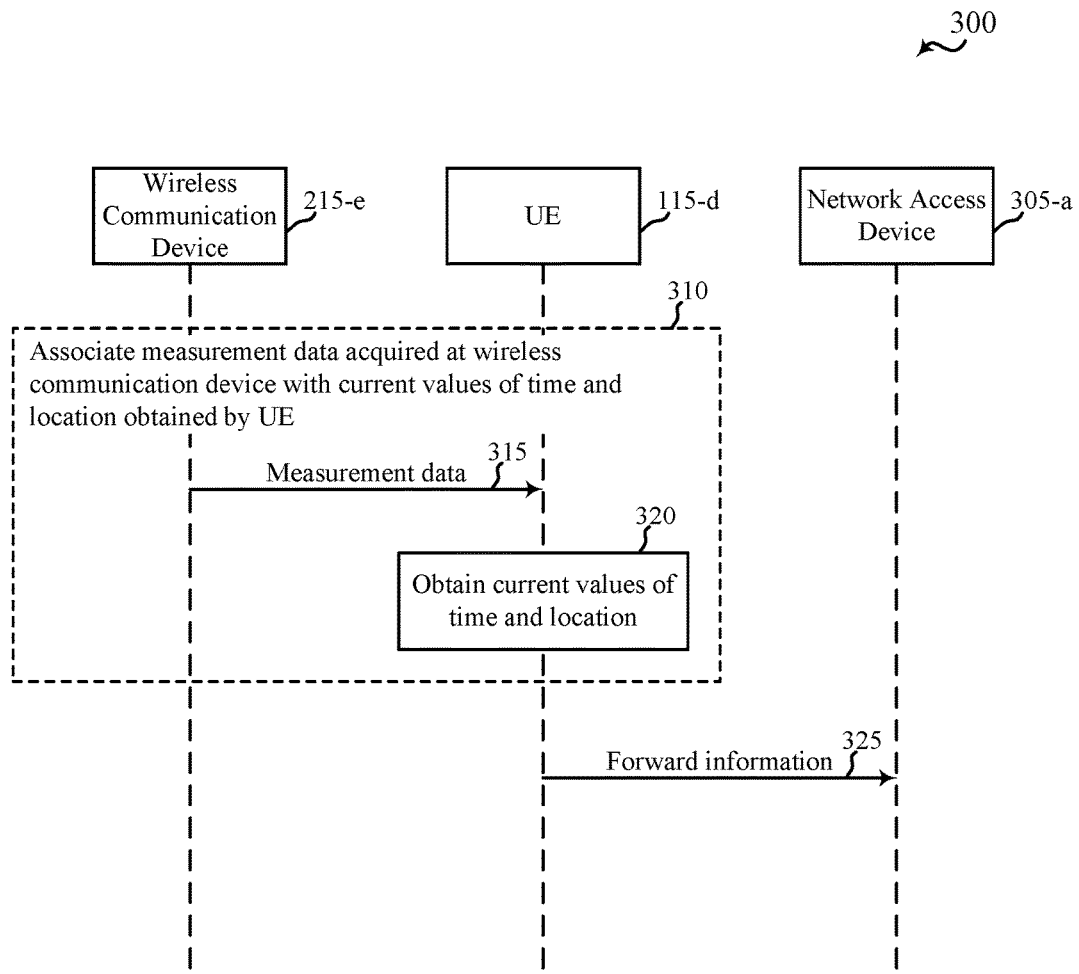
FIG. 3 shows a message flow between a wireless communication device (e.g., an IOT device), a UE, and a network access device, in accordance with various aspects of the present disclosure.

FIG. 3 shows a message flow 300 between a wireless communication device 215-e (e.g., an IOT device), a UE 115-d, and a network access device 305-a, in accordance with various aspects of the present disclosure. In some examples, the UE 115-d may be an example of aspects of the UEs 115 described with reference to FIG. 1 or 2. In some examples, the wireless communication device 215-e may be an example of aspects of the wireless communication devices 215 described with reference to FIG. 2, or the network access device 305-*a* may be an example of aspects of the base stations 105 described with reference to FIG. 1 or 2 or the WLAN access point 235 described with reference to FIG. 2.

At 310, the UE 115-*d* may obtain measurement data from the wireless communication device 215-*e*, and current values of time and location, for forwarding to the network access device 305-*a*. In particular, at 315, the wireless communication device 215-*e* may transmit measurement data to the UE 115-*d*. The measurement data may be acquired at the wireless communication device 215-*e*. In some examples, the measurement data may include: a sensor reading, or an identity of the wireless communication device 215-*e*, or a combination thereof. In some examples, the measurement data may be transmitted with a beacon or request for relaying services. In some examples, the UE 115-*d* may discover the wireless communication device 215-*e*, prior to 315, based at least in part on a beacon or request for relaying services transmitted by the wireless communication device 215-*e*.

At 320, the UE 115-*d* may obtain current values of time and location and associate an indicator of the current values of time and location with the received measurement data. In some examples, the current values of time and location may be obtained from: a first sensor of the UE 115-*d*, or a second sensor remote from both the UE 115-*d* and the wireless communication device 215-*e*, or a combination thereof. In some examples, the indicator of the current values of time and location may include: the current values of time and location, or a HASH over the current values of time and location, or a combination thereof.

At 325, the UE 115-*d* may forward the measurement data and associated indicator of the current values of time and location to a data collector (e.g., a network data repository or application) via the network access device 305-*a*. In some examples, the forwarding may occur: upon receiving the measurement data, or upon entering a service area for a network connected to the data collector, or at a time determined by the UE 115-*d*, or at a combination thereof. In some examples, the UE 115-*d* may determine when it is connected to the network connected to the data collector, and may cache the measurement data and associated indicator of the current values of time and location when the measurement data and associated indicator of the current values of time and location are not forwarded to the data collector upon receiving the measurement data. In some examples, the measurement data and associated indicator of the current values of time and location may be forwarded to the data collector on a second wireless interface (e.g., a cellular network interface (e.g., a 2.5G, 3G, 4G, LTE/LTE-A, 5G, cellular Internet of Things (CIOT), General Packet Radio Service (GPRS), EDGE, machine type communication (MTC), or enhanced MTC (eMTC) interface) or a Wi-Fi interface).

The message flow 300 enables the wireless communication device 215-*e* to transmit measurement data to a data collector via a designated or random UE, which designated or random UE may associate current values of time and location with the measurement data. The current values of time and location may be values that the wireless communication device 215-*e* is unable to determine (e.g., because the wireless communication device 215-*e* has limited functionality and is unable to determine time or location locally). In some examples, the UE 115-*d* may automatically associate the current values of time and location with the measurement data, while in other examples, the UE 115-*d* may associate the current values of time and location with the measurement data upon receiving a request to do so (e.g., a request from the wireless communication device 215-*e*).

In some cases, the transmission of measurement data, at 315, may be vulnerable to replay attacks. In such replay attacks, an adversary may receive (or overhear) the data transmission at 315 and replay the data transmission at a different time or location, thus obscuring the location of the wireless communication device 215-*e* or the time at which measurement data is transmitted at 315. In some examples, the UE 115-*d* may be an adversary involved in a replay attack. In some examples, another UE may be an adversary involved in a replay attack. In either case, the replayed transmission of measurement data may arrive at a data collector with false timing or location information. A replay attack (e.g., by a UE other than the UE 115-*d*) may be especially effective when the forwarding at 325 occurs after a delay, such that messages do not arrive at the data collector in temporal order. Message flows that may be less vulnerable to replay attacks are described with reference to FIGS. 4 and 5.

Figure 4:
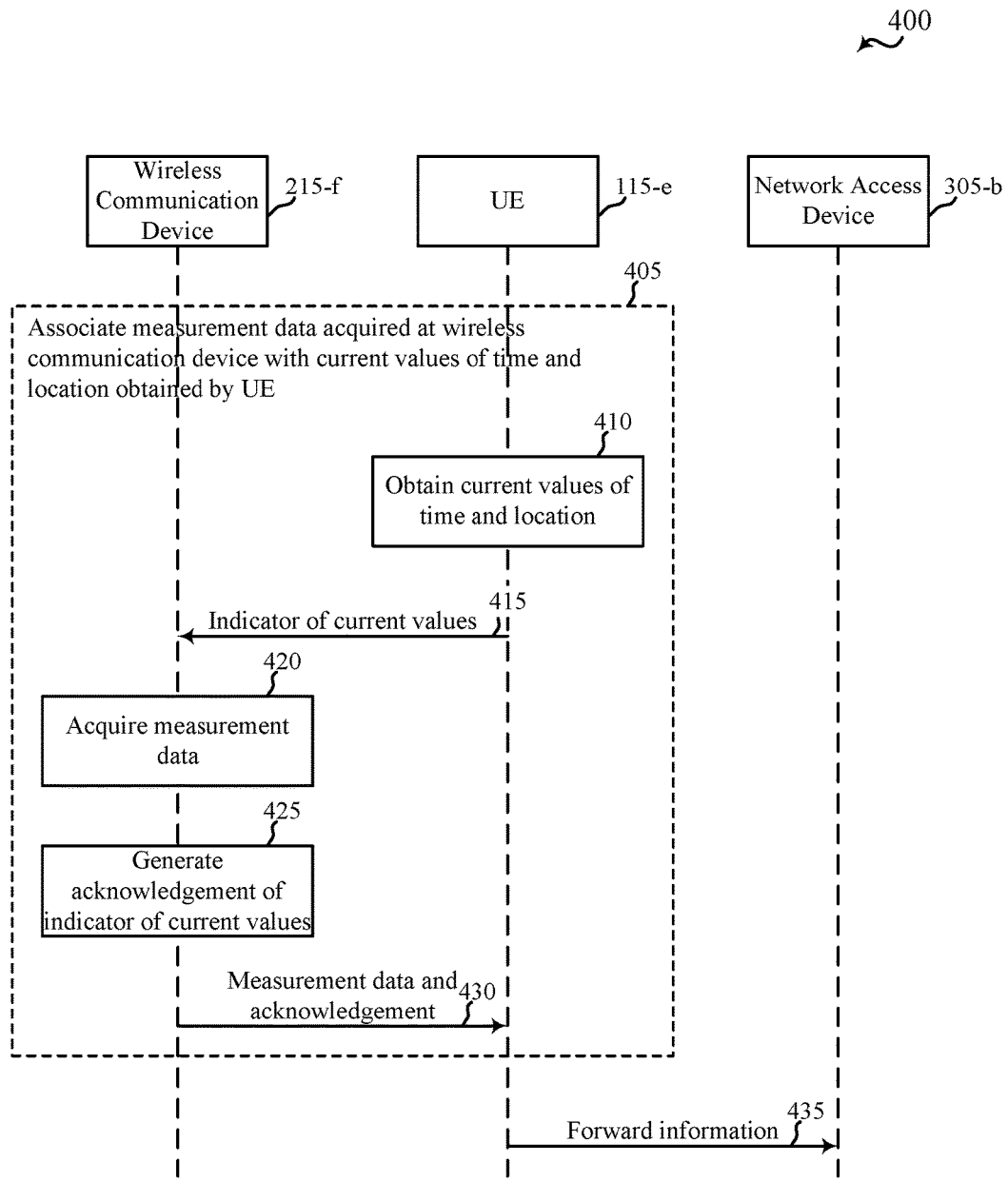
FIG. 4 shows a message flow between a wireless communication device (e.g., an IOT device), a UE, and a network access device, in accordance with various aspects of the present disclosure.

FIG. 4 shows a message flow 400 between a wireless communication device 215-*f* (e.g., an IOT device), a UE 115-*e*, and a network access device 305-*b*, in accordance with various aspects of the present disclosure. In some examples, the UE 115-*e* may be an example of aspects of the UEs 115 described with reference to FIGS. 1-3. In some examples, the wireless communication device 215-*f* may be an example of aspects of the wireless communication devices 215 described with reference to FIG. 2 or 3, or the network access device 305-*b* may be an example of aspects of the base stations 105 described with reference to FIG. 1 or 2, the WLAN access point 235 described with reference to FIG. 2, or the network access device 305 described with reference to FIG. 3.

At 405, the UE 115-*e* may obtain measurement data from the wireless communication device 215-*f*, and current values of time and location, for forwarding to the network access device 305-*b*. In particular, at 410, the UE 115-*e* may obtain current values of time and location. In some examples, the current values of time and location may be obtained from: a first sensor of the UE 115-*e*, or a second sensor remote from both the UE 115-*e* and the wireless communication device 215-*f*, or a combination thereof. In some examples, the UE 115-*e* may discover the wireless communication device 215-*f*, prior to 410, based at least in part on a beacon or request (e.g., a request for: the current values of time and location, or relaying services, or a combination thereof) transmitted by the wireless communication device 215-*f*.

At 415, the UE 115-*e* may transmit, to the wireless communication device 215-*f*, an indicator of the current values of time and location. In some examples, the indicator of the current values of time and location may include: the current values of time and location, or a HASH over the current values of time and location, or a combination thereof. In some examples, the indicator of the current values of time and location may be transmitted on a first wireless interface (e.g., a Bluetooth, BLE, ZigBee, Wi-Fi, LTE-D, 5G, or unlicensed spectrum interface).

At 420, the wireless communication device 215-*f* may acquire measurement data. The measurement data may be acquired before or after the indicator of the current values of time and location is received from the UE 115-*e*. In some examples, the measurement data may include: a sensor reading, or an identity of the wireless communication device 215-*f*, or a combination thereof.

At 425, the wireless communication device 215-*f* may generate an acknowledgement of the indicator of the current values of time and location. In some examples, the acknowledgement of the indicator of the current values of time and location may include: a binding of the indicator of the current values of time and location to the measurement data, or a signature of the indicator of the current values of time and location. In some examples, the binding of the indicator of the current values of time and location to the measurement data may be based on a digital signature of the time and location information, using a key that the wireless communication device 215-*f* shares with a data collector that receives the wireless communication device's measurement data. In some examples, the wireless communication device 215-*f* may receive more than one indicator or item of information from the UE 115-*e*, and the wireless communication device 215-*f* may bind a subset of the indicators or items of information to the measurement data. Similarly, and in some examples, the wireless communication device 215-*f* may bind one or more indicators or items of information to a subset of the measurement data. In some examples, a binding between one or more indicators or items of information received from the UE 115-*e* and the measurement data may be based at least in part on a message authentication code (MAC; e.g., a MAC based on a Secure Hash Algorithm 1 (SHA1) or SHA2 algorithm).

At 430, the wireless communication device 215-*f* may transmit, to the UE 115-*e*, the measurement data and the acknowledgement of the indicator of the current values of time and location. The measurement data and acknowledgement of the indicator of the current values of time and location may be transmitted together or separately. In some examples, the measurement data and acknowledgement of the indicator of the current values of time and location may be transmitted on the first wireless interface. In some examples, the wireless communication device 215-*f* may also transmit the indicator of the current values of time and location to the UE 115-*e*. For example, the wireless communication device 215-*f* may include or enclose the indicator of the current values of time and location in the measurement data. In some examples, the measurement data and other information transmitted to the UE 115-*e* may be randomized to increase the entropy between different transmissions of the wireless communication device 215-*f*.

At 435, the UE 115-*e* may forward the measurement data and the acknowledgement of the indicator of the current values of time and location to a data collector (e.g., a network data repository or application) via the network access device 305-*b*. In some examples, the forwarding may occur: upon receiving the measurement data and the acknowledgement of the indicator of the current values of time and location, or upon entering a service area for a network connected to the data collector, or at a time determined by the UE 115-*e*, or at a combination thereof. In some examples, the UE 115-*e* may determine when it is connected to the network connected to the data collector, and may cache the measurement data and the acknowledgement of the indicator of the current values of time and location when the measurement data and the acknowledgement of the indicator of the current values of time and location are not forwarded to the data collector upon receiving the measurement data. In some examples, the UE 115-*e* may forward to the data collector, with the measurement data and the acknowledgement of the indicator of the current values of time and location, at least one of: the indicator of the current values of time and location, or the current values of time and location, or a second indicator of the current values of time and location. In some examples, the measurement data and the acknowledgement of the indicator of the current values of time and location may be forwarded to the data collector on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface).

Figure 5:
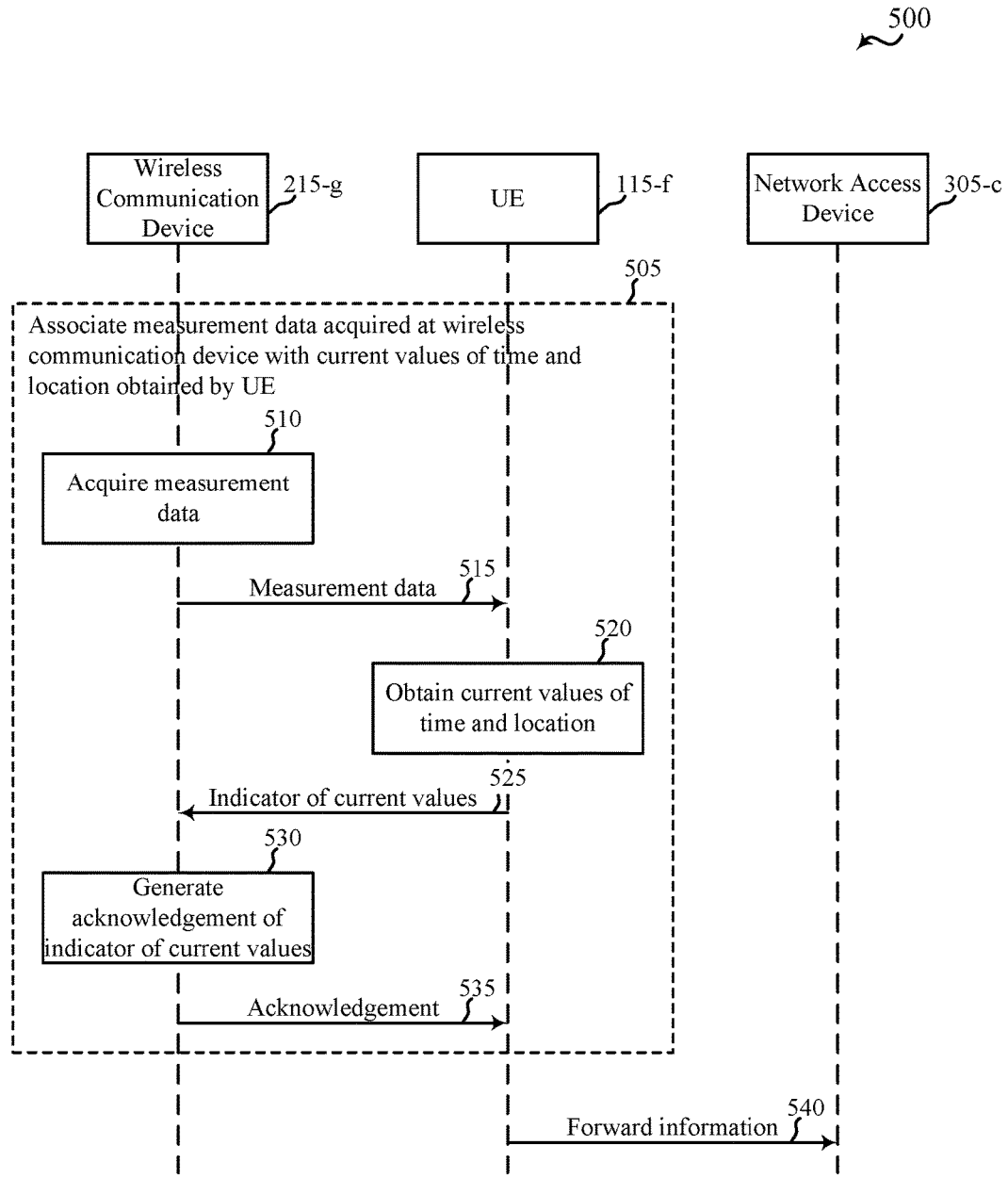
FIG. 5 shows a message flow between a wireless communication device (e.g., an IOT device), a UE, and a network access device, in accordance with various aspects of the present disclosure.

FIG. 5 shows a message flow 500 between a wireless communication device 215-*g* (e.g., an IOT device), a UE 115-*f*, and a network access device 305-*c*, in accordance with various aspects of the present disclosure. In some examples, the UE 115-*f* may be an example of aspects of the UEs 115 described with reference to FIGS. 1-4. In some examples, the wireless communication device 215-*g* may be an example of aspects of the wireless communication devices 215 described with reference to FIGS. 2-4, or the network access device 305-*c* may be an example of aspects of the base stations 105 described with reference to FIG. 1 or 2, the WLAN access point 235 described with reference to FIG. 2, or the network access devices 305 described with reference to FIG. 3 or 4.

At 505, the UE 115-*f* may obtain measurement data from the wireless communication device 215-*g*, and current values of time and location, for forwarding to the network access device 305-*c*. In particular, at 510, the wireless communication device 215-*g* may acquire measurement data. In some examples, the measurement data may include: a sensor reading, or an identity of the wireless communication device 215-*g*, or a combination thereof.

At 515, the wireless communication device 215-*g* may transmit the measurement data to the UE 115-*f*. In some examples, the measurement data may be transmitted on a first wireless interface (e.g., a Bluetooth, BLE, ZigBee, Wi-Fi, LTE-D, 5G, or unlicensed spectrum interface).

At 520, the UE 115-*f* may obtain current values of time and location. In some examples, the current values of time and location may be obtained from: a first sensor of the UE 115-*f*, or a second sensor remote from both the UE 115-*f* and the wireless communication device 215-*g*, or a combination thereof.

At 525, the UE 115-*f* may transmit, to the wireless communication device 215-*g*, an indicator of the current values of time and location. In some examples, the indicator of the current values of time and location may include: the current values of time and location, or a HASH over the current values of time and location, or a combination thereof. In some examples, the indicator of the current values of time and location may be transmitted on the first wireless interface.

At 530, the wireless communication device 215-*g* may generate an acknowledgement of the indicator of the current values of time and location. In some examples, the acknowledgement of the indicator of the current values of time and location may include: a binding of the indicator of the current values of time and location to the measurement data, or a signature of the indicator of the current values of time and location. In some examples, the binding of the indicator of the current values of time and location to the measurement data may be based on a digital signature of the time and location information, using a key that the wireless communication device 215-*g* shares with a data collector that receives the wireless communication device's measurement data. In some examples, the wireless communication device 215-*g* may receive more than one indicator or item of information from the UE 115-*f*, and the wireless communication device 215-*g* may bind a subset of the indicators or items of information to the measurement data. Similarly, and in some examples, the wireless communication device 215-*g* may bind one or more indicators or items of information to a subset of the measurement data. In some examples, a binding between one or more indicators or items of information received from the UE 115-*f* and the measurement data may be based at least in part on a MAC (e.g., a MAC based on an SHA1 or SHA2 algorithm).

At 535, the wireless communication device 215-*g* may transmit, to the UE 115-*f*, the acknowledgement of the indicator of the current values of time and location. In some examples, the acknowledgement of the indicator of the current values of time and location may be transmitted on the first wireless interface. In some examples, the wireless communication device 215-*g* may also transmit additional measurement data and/or the indicator of the current values of time and location to the UE 115-*f*. For example, the wireless communication device 215-*g* may include or enclose the indicator of the current values of time and location in the additional measurement data. In some examples, the additional measurement data and other information transmitted to the UE 115-*f* may be randomized to increase the entropy between different transmissions of the wireless communication device 215-*g*.

At 540, the UE 115-*f* may forward the measurement data and the acknowledgement of the indicator of the current values of time and location to a data collector (e.g., a network data repository or application) via the network access device 305-*c*. In some examples, the forwarding may occur: upon receiving the acknowledgement of the indicator of the current values of time and location, or upon entering a service area for a network connected to the data collector, or at a time determined by the UE 115-*f*, or at a combination thereof. In some examples, the UE 115-*f* may determine when it is connected to the network connected to the data collector, and may cache the measurement data and the acknowledgement of the indicator of the current values of time and location when the measurement data and the acknowledgement of the indicator of the current values of time and location are not forwarded to the data collector upon receiving the measurement data. In some examples, the UE 115-*f* may forward to the data collector, with the measurement data and the acknowledgement of the indicator of the current values of time and location, at least one of: the indicator of the current values of time and location, or the current values of time and location, or a second indicator of the current values of time and location. In some examples, the measurement data and the acknowledgement of the indicator of the current values of time and location may be forwarded to the data collector on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface).

Figure 6:
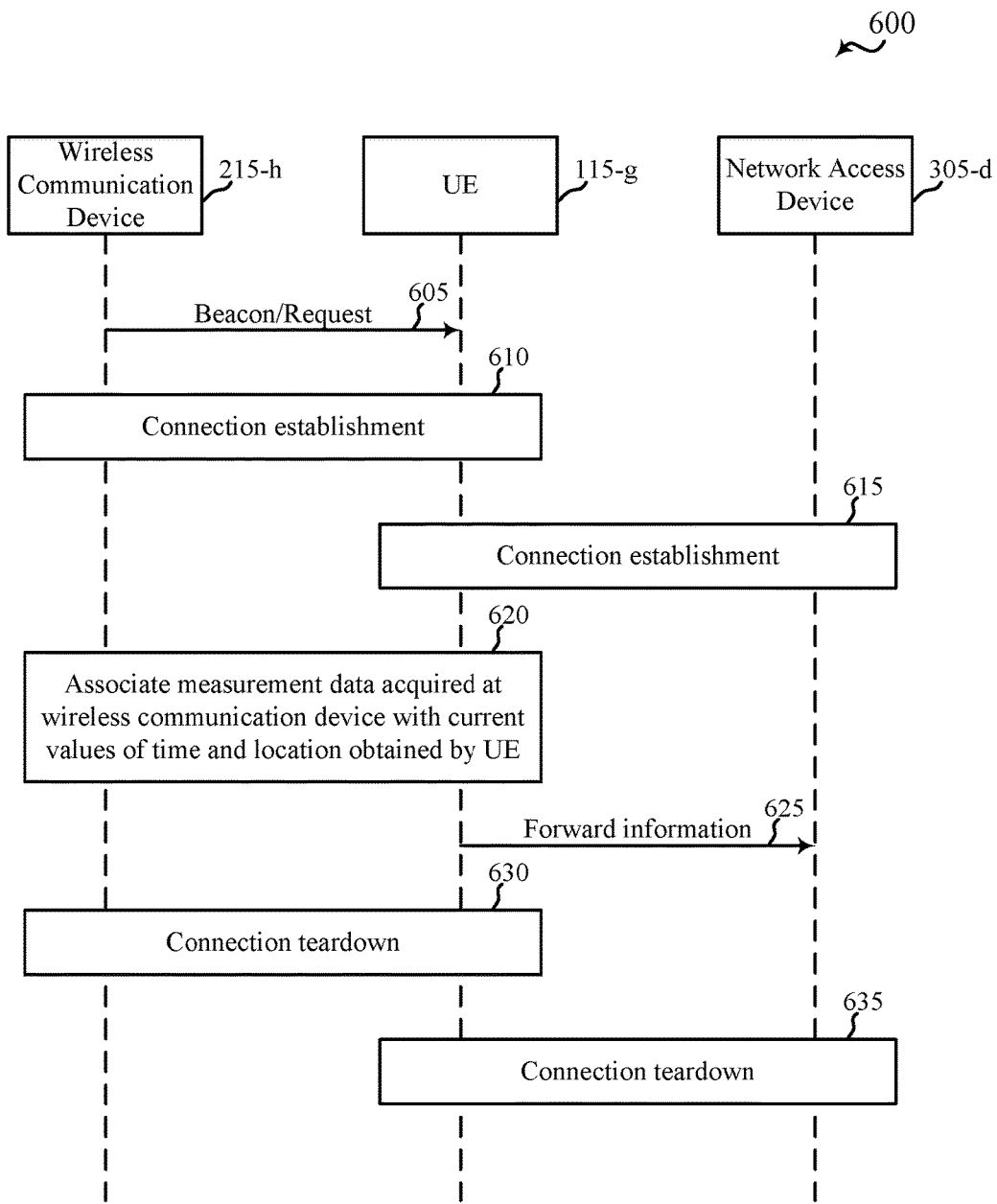
FIG. 6 shows a message flow between a wireless communication device (e.g., an IOT device), a UE, and a network access device, in accordance with various aspects of the present disclosure.

FIG. 6 shows a message flow 600 between a wireless communication device 215-*h* (e.g., an IOT device), a UE 115-*g*, and a network access device 305-*d*, in accordance with various aspects of the present disclosure. In some examples, the UE 115-*g* may be an example of aspects of the UEs 115 described with reference to FIGS. 1-5. In some examples, the wireless communication device 215-*h* may be an example of aspects of the wireless communication devices 215 described with reference to FIGS. 2-5, or the network access device 305-*d* may be an example of aspects of the base stations 105 described with reference to FIG. 1 or 2, the WLAN access point 235 described with reference to FIG. 2, or the network access devices 305 described with reference to FIGS. 3-5.

At 605, the wireless communication device 215-*h* may transmit a beacon or request. The request may include a request for: current values of time and location, or relaying services, or a combination thereof. In some examples, the beacon or request may be transmitted on a first wireless interface (e.g., a Bluetooth, BLE, ZigBee, Wi-Fi, LTE-D, 5G, or unlicensed spectrum interface).

At 610, and based at least in part on receiving the beacon or request transmitted by the wireless communication device 215-*h*, the UE 115-*g* may establish a connection with the wireless communication device 215-*h*. At 615, the UE 115-*g* may also establish a concurrent connection with the network access device 305-*d* (or determine that a concurrent connection with the network access device 305-*d* already exists).

At 620, the UE 115-*g* may obtain measurement data from the wireless communication device 215-*h*, and current values of time and location, for forwarding to the network access device 305-*d*. In some examples, the operations at 620 may be performed as described with reference to FIG. 3, 4, or 5 at 310, 405, or 505.

At 625, the UE 115-*g* may forward the measurement data, an indicator of the current values of time and location, an acknowledgement of the indicator of the current values of time and location, and/or other information to a data collector (e.g., a network data repository or application) via the network access device 305-*d*. The forwarding may occur: upon receiving the acknowledgement of the indicator of the current values of time and location from the wireless communication device 215-*h*. In some examples, the measurement data, the indicator of the current values of time and location, the acknowledgement of the indicator of the current values of time and location, and/or the other information may be forwarded to the data collector on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface).

At 630, subsequent to the transmission(s) at 620 or 625, the UE 115-*g* or wireless communication device 215-*h* may initiate a tear down of the connection between the wireless communication device 215-*h*; and at 635, the UE 115-*g* or network access device 305-*d* may optionally tear down the connection with the network access device 305-*d*. The tear down at 635 may be performed before, during, or after the tear down at 630.

In the message flow 600, the UE 115-*g* may support an end-to-end connection between the wireless communication device 215-*h* and the data collector, which may allow the data collector to directly verify the authenticity of the wireless communication device 215-*h* and/or its acknowledgement of any indicator(s) or information obtained by the UE 115-*g* for association with the measurement data.

Figure 7:
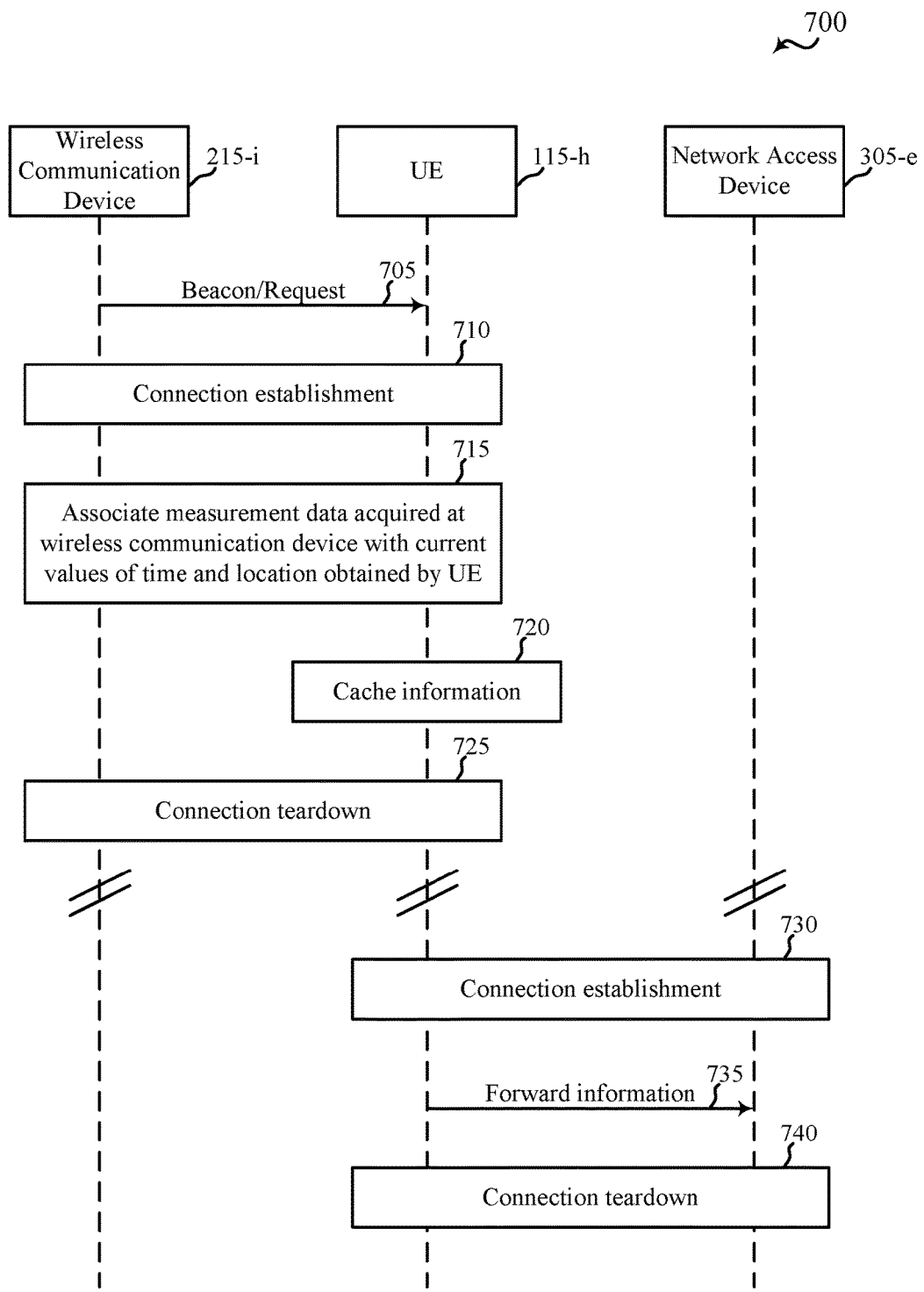
FIG. 7 shows a message flow between a wireless communication device (e.g., an IOT device), a UE, and a network access device, in accordance with various aspects of the present disclosure.

FIG. 7 shows a message flow 700 between a wireless communication device 215-*i* (e.g., an IOT device), a UE 115-*h*, and a network access device 305-*e*, in accordance with various aspects of the present disclosure. In some examples, the UE 115-*h* may be an example of aspects of the UEs 115 described with reference to FIGS. 1-6. In some examples, the wireless communication device 215-*i* may be an example of aspects of the wireless communication devices 215 described with reference to FIGS. 2-6, or the network access device 305-*e* may be an example of aspects of the base stations 105 described with reference to FIG. 1 or 2, the WLAN access point 235 described with reference to FIG. 2, or the network access devices 305 described with reference to FIGS. 3-6.

At 705, the wireless communication device 215-i may transmit a beacon or request. The request may include a request for: current values of time and location, or relaying services, or a combination thereof. In some examples, the beacon or request may be transmitted on a first wireless interface (e.g., a Bluetooth, BLE, ZigBee, Wi-Fi, LTE-D, 5G, or unlicensed spectrum interface).

At 710, and based at least in part on receiving the beacon or request transmitted by the wireless communication device 215-i, the UE 115-h may establish a connection with the wireless communication device 215-i.

At 715, the UE 115-h may obtain measurement data from the wireless communication device 215-i, and current values of time and location, for forwarding to the network access device 305-e. In some examples, the operations at 715 may be performed as described with reference to FIG. 3, 4, or 5 at 310, 405, or 505.

At 720, the UE 115-h may determine that it is not connected to a network connected to an appropriate data collector, or that it is not within a service area for a network connected to an appropriate data collector, or that another reason exists for delaying a forwarding of the measurement data to a data collector. In response to such a determination, the UE 115-h may cache measurement data, an acknowledgement of an indicator of current values of time and location, or other information received from the wireless communication device 215-i, as well as associated information obtained by the UE 115-h.

At 725, subsequent to the transmission(s) at 720, the UE 115-h or wireless communication device 215-i may initiate a tear down of the connection between the wireless communication device 215-i.

At 730, the UE 115-h may establish a connection with the network access device 305-e (or determine that a connection with the network access device 305-e already exists).

At 735, the UE 115-h may forward the measurement data, an indicator of the current values of time and location, an acknowledgement of the indicator of the current values of time and location, and/or other information to a data collector (e.g., a network data repository or application) via the network access device 305-e. The forwarding may occur: upon connecting, via the network access device 305-e, to a network connected to the data collector. The forwarding may also occur at a time determined by the UE 115-h. In some examples, the measurement data, the indicator of the current values of time and location, the acknowledgement of the indicator of the current values of time and location, and/or the other information may be forwarded to the data collector on a second wireless interface (e.g., a cellular network interface (e e.g., a 2.5G, 3G, 4G, LTE/LTE-A, 5G, CIOT, GPRS, EDGE, MTC, or eMTC interface) or a Wi-Fi interface).

At 740, subsequent to the transmission(s) at 735, the UE 115-h or network access device 305-e may optionally tear down the connection with the network access device 305-e.

In the message flow 700, the UE 115-h may exploit delay-tolerant measurement data forwarding to forward measurement data acquired when the UE 115-h is not connected to a network connected to a data collector, or when the UE 115-h determines not to forward data immediately due to, for example, low battery power, a heavy processing burden, a slow network connection, etc. Because measurement data received at the UE 115-h from the wireless communication device 215-i is not immediately forwarded to a data collector, and because an end-to-end connection is not formed between the wireless communication device 215-i and the data collector, the transmission of measurement data at 715 may be more vulnerable to replay attacks than the transmission of measurement data at 620 (of FIG. 6). However, the wireless communication device's acknowledgement of one or more indicators or items of information obtained by the UE 115-h, at 715, helps to mitigate the likelihood of a successful replay attack.

Figure 8:
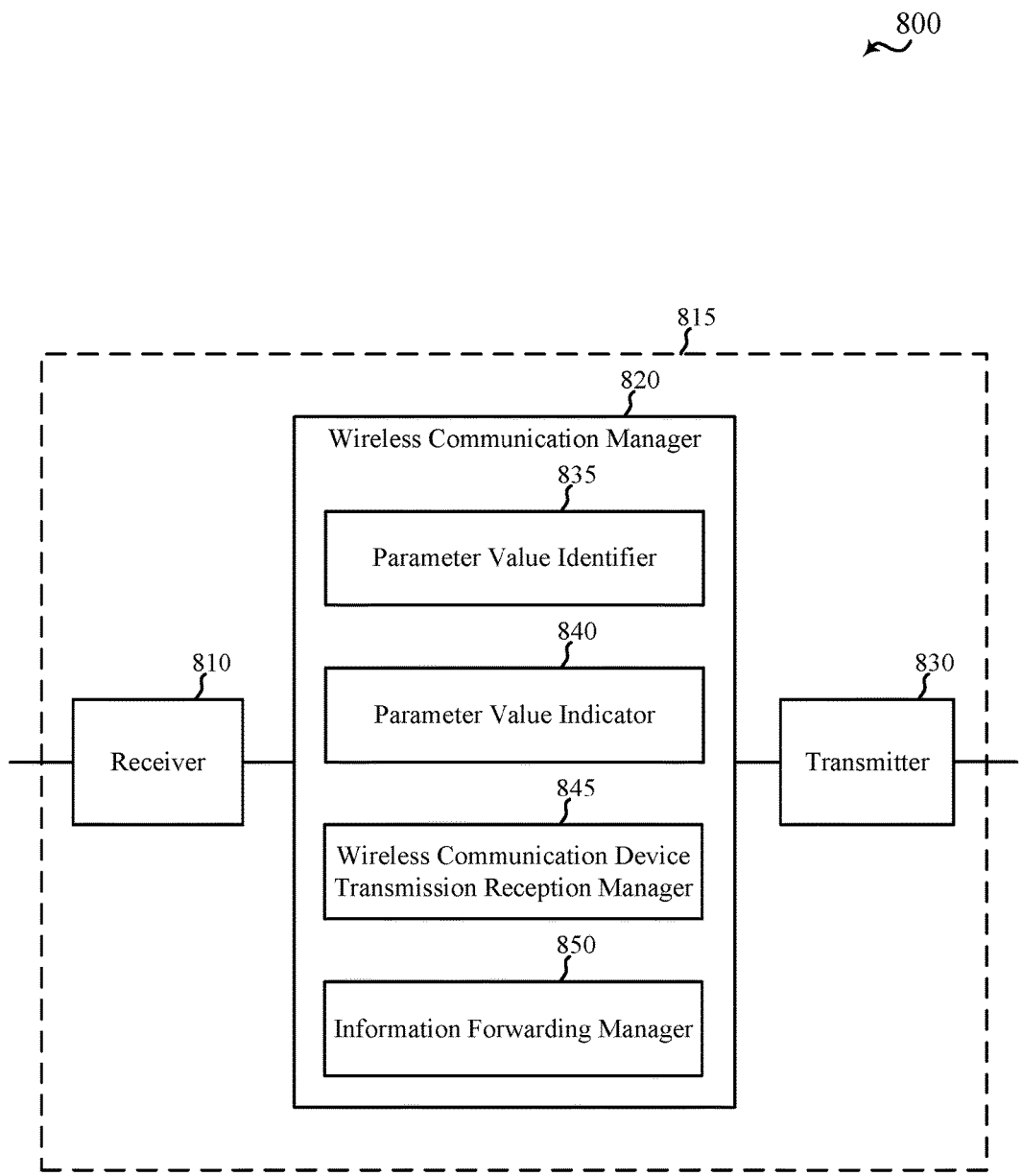
FIG. 8 shows a block diagram of an apparatus for use in wireless communication at a UE, in accordance with various aspects of the present disclosure.

FIG. 8 shows a block diagram 800 of an apparatus 815 for use in wireless communication at a UE, in accordance with various aspects of the present disclosure. The apparatus 815 may be an example of aspects of one or more of the UEs 115 described with reference to FIG. 1, 2, 3, 4, 5, 6, or 7. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over one or more spectrums. In some examples, the one or more spectrums may be used for Bluetooth, BLE, ZigBee, Wi-Fi, LTE-D, unlicensed spectrum, 2.5G, 3G, 4G, LTE/LTE-A, 5G, CIOT, GPRS, EDGE, MTC, or eMTC communications, as described, for example, with reference to FIGS. 1-7. The receiver 810 may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter 830 may include at least one RF transmitter, such as at least one RF transmitter operable to transmit over one or more spectrums. In some examples, the one or more spectrums may be used for Bluetooth, BLE, ZigBee, Wi-Fi, LTE-D, unlicensed spectrum, 2.5G, 3G, 4G, LTE/LTE-A, 5G, CIOT, GPRS, EDGE, MTC, or eMTC communications, as described, for example, with reference to FIGS. 1-7. The transmitter 830 may be used to transmit various types of data or control signals (i.e., transmissions) over one or more communication links of a wireless communication system, such as one or more communication links of the wireless communication system 100 or 200 described with reference to FIG. 1 or 2.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a parameter value identifier 835, a parameter value indicator 840, a wireless communication device transmission reception manager 845, or an information forwarding manager 850.

The parameter value identifier 835 may be used to obtain current values of time and location. In some examples, the current values of time and location may be obtained from: a first sensor of the apparatus 815, or a second sensor remote from both the apparatus 815 and a wireless communication device (e.g., an IOT device), or a combination thereof.

The parameter value indicator 840 may be used to transmit, to the wireless communication device, an indicator of the current values of time and location. In some examples, the indicator of the current values of time and location may include: the current values of time and location, or a HASH over the current values of time and location, or a combination thereof. In some examples, the indicator of the current values of time and location may be transmitted on a first wireless interface (e.g., a Bluetooth, BLE, ZigBee, Wi-Fi, LTE-D, or unlicensed spectrum interface).

The wireless communication device transmission reception manager 845 may be used to receive, from the wireless communication device, measurement data acquired at the wireless communication device and an acknowledgement of the indicator of the current values of time and location. The measurement data and acknowledgement of the indicator of the current values of time and location may be received together or separately. In some examples, the measurement data and acknowledgement of the indicator may be received after the indicator of the current values of time and location is transmitted by the parameter value indicator 840. In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the measurement data and acknowledgement of the indicator of the current values of time and location may be received on the first wireless interface.

The information forwarding manager 850 may be used to forward the measurement data and the acknowledgement of the indicator of the current values of time and location to a data collector (e.g., a network data repository or application). In some examples, the forwarding may occur: upon receiving the acknowledgement of the indicator of the current values of time and location, or upon entering a service area for a network connected to the data collector, or at a time determined by the information forwarding manager 850, or at a combination thereof. In some examples, the forwarding may further include forwarding, with the measurement data and the acknowledgement of the indicator of the current values of time and location, at least one of: the indicator of the current values of time and location, or the current values of time and location, or a second indicator of the current values of time and location. In some examples, the forwarding may occur on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface).

Figure 9:
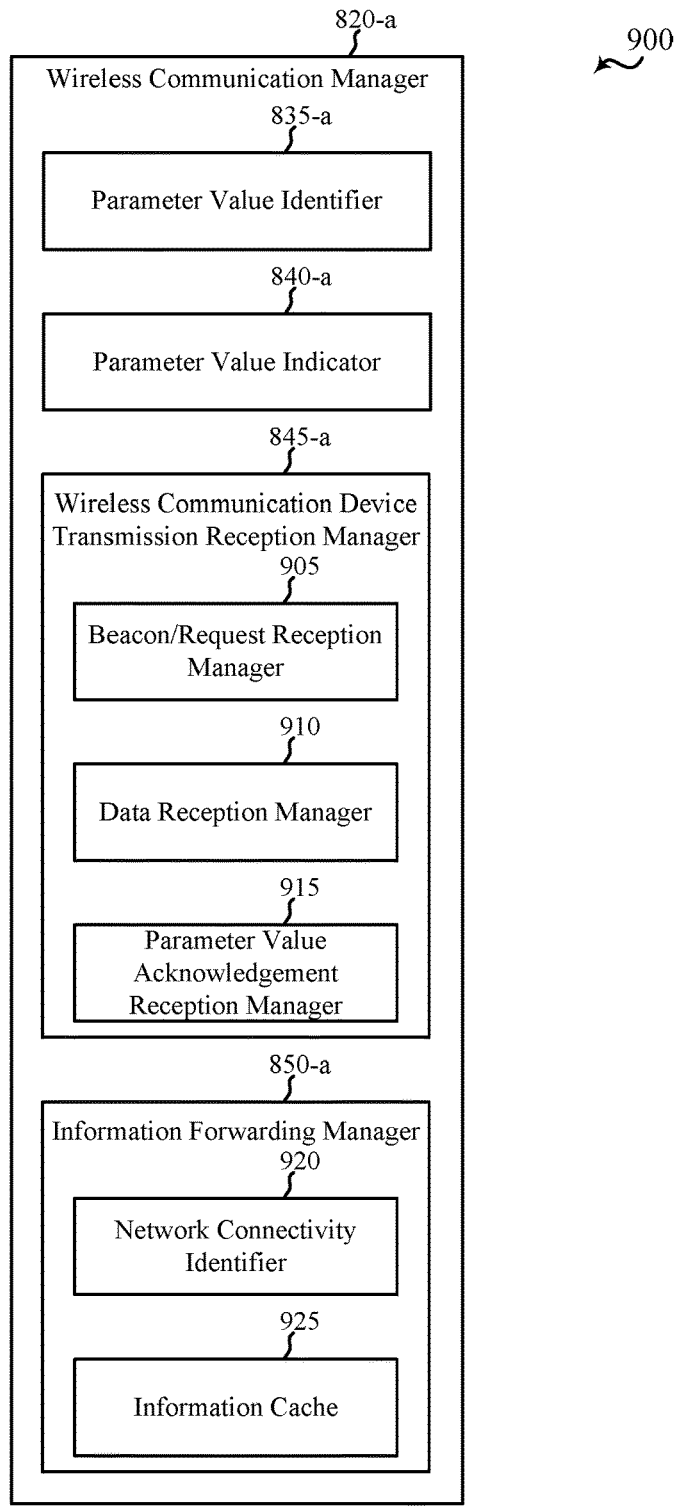
FIG. 9 shows a block diagram of a wireless communication manager for use in wireless communication at a UE, in accordance with various aspects of the present disclosure.

FIG. 9 shows a block diagram 900 of a wireless communication manager 820-*a* for use in wireless communication at a UE, in accordance with various aspects of the present disclosure. The wireless communication manager 820-*a* may be an example of aspects of the wireless communication manager 820 described with reference to FIG. 8.

The components of the wireless communication manager 820-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820-*a* may be used to manage one or more aspects of wireless communication for a UE or apparatus, such as one of the UEs 115 or the apparatus 815 described with reference to FIG. 1, 2, 3, 4, 5, 6, 7, or 8. In some examples, part of the wireless communication manager 820-*a* may be incorporated into or shared with a receiver or a transmitter (e.g., the receiver 810 or the transmitter 830 described with reference to FIG. 8). In some examples, the wireless communication manager 820-*a* may include a parameter value identifier 835-*a*, a parameter value indicator 840-*a*, a wireless communication device transmission reception manager 845-*a*, or an information forwarding manager 850-*a*.

The parameter value identifier 835-*a* may be used to obtain current values of time and location. In some examples, the current values of time and location may be obtained from: a first sensor of an apparatus including the wireless communication manager 820-*a*, or a second sensor remote from both an apparatus including the wireless communication manager 820-*a* and a wireless communication device (e.g., an IOT device), or a combination thereof.

The parameter value indicator 840-*a* may be used to transmit, to the wireless communication device, an indicator of the current values of time and location. In some examples, the indicator of the current values of time and location may include: the current values of time and location, or a HASH over the current values of time and location, or a combination thereof. In some examples, the indicator of the current values of time and location may be transmitted on a first wireless interface (e.g., a Bluetooth, BLE, ZigBee, Wi-Fi, LTE-D, 5G, or unlicensed spectrum interface).

The wireless communication device transmission reception manager 845-*a* may include a beacon/request reception manager 905, a data reception manager 910, or a parameter value acknowledgement reception manager 915. The beacon/request reception manager 905 may be used to receive a beacon or request from the wireless communication device. The request may include a request for: the current values of time and location, or relaying services, or a combination thereof. In some examples, the parameter value identifier 835-*a* may be used to obtain the current values of time and location to the wireless communication device, or the parameter value indicator 840-*a* may be used to transmit the indicator of the current values of time and location to the wireless communication device, based at least in part on the beacon/request reception manager 905 receiving a beacon or request from the wireless communication device. In some examples, the beacon or request may be received on the first wireless interface.

The data reception manager 910 may be used to receive, from the wireless communication device, measurement data acquired at the wireless communication device. In some examples, the measurement data may be received after the indicator of the current values of time and location is transmitted to the wireless communication device by the parameter value indicator 840-*a*. In some examples, the measurement data may be received before the indicator of the current values of time and location is transmitted to the wireless communication device by the parameter value indicator 840-*a*. In some examples, measurement data may be received before the indicator of the current values of time and location is transmitted to the wireless communication device, and additional measurement data may be received after the indicator of the current values of time and location is transmitted to the wireless communication device. When the measurement data is received before the indicator of the current values of time and location is transmitted, the indicator may in some cases be transmitted to the wireless communication device based at least in part on the data reception manager 910 receiving the measurement data. In some examples, the measurement data may include: a sensor reading, or an identity of the wireless communication device, or a combination thereof. In some examples, the measurement data may be received on the first wireless interface.

The parameter value acknowledgement reception manager 915 may be used to receive, from the wireless communication device, an acknowledgement of the indicator of the current values of time and location. In some examples, the acknowledgement of the indicator of the current values of time and location may be received together with the measurement data received by the data reception manager 910, after the indicator of the current values of time and location is transmitted by the parameter value indicator 840-*a*. In some examples, the acknowledgement of the indicator of the current values of time and location may be received separately from the measurement data received by the data reception manager 910, after the indicator of the current values of time and location is transmitted by the parameter value indicator 840-*a*. In some examples, the acknowledgement of the indicator of the current values of time and location may include: a binding of the indicator of the current values of time and location to the measurement data, or a signature of the indicator of the current values of time and location, or a combination thereof. In some examples, the acknowledgement of the indicator of the current values of time and location may be received on the first wireless interface.

In a system in which the measurement data and acknowledgement of the indicator of the current values of time and location are transmitted together, the measurement data and acknowledgement of the indicator of the current values of time and location may not be separable by the wireless communication manager 820-*a* and the functions of the data reception manager 910 and parameter value acknowledgement reception manager 915 may be provided by a data and parameter value acknowledgement reception manager (not shown).

The information forwarding manager 850-*a* may be used to forward the measurement data and the acknowledgement of the indicator of the current values of time and location to a data collector (e.g., a network data repository or application). In some examples, the forwarding may occur: upon receiving the acknowledgement of the indicator of the current values of time and location, or upon entering a service area for a network connected to the data collector, or at a time determined by the information forwarding manager 850-*a*, or at a combination thereof. In some examples, the information forwarding manager 850-*a* may include a network connectivity identifier 920 to determine when the UE is connected to the network connected to the data collector. The information forwarding manager 850-*a* may also include an information cache 925 to cache the measurement data, the acknowledgement of the indicator of the current values of time and location, or other information (e.g., when the network connectivity identifier 920 determines the UE is not connected to the network connected to the data collector. In some examples, the information forwarding manager 850 may forward, with the measurement data and the acknowledgement of the indicator of the current values of time and location, at least one of: the indicator of the current values of time and location, or the current values of time and location, or a second indicator of the current values of time and location. In some examples, the forwarding of information may occur on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface).

Figure 10:
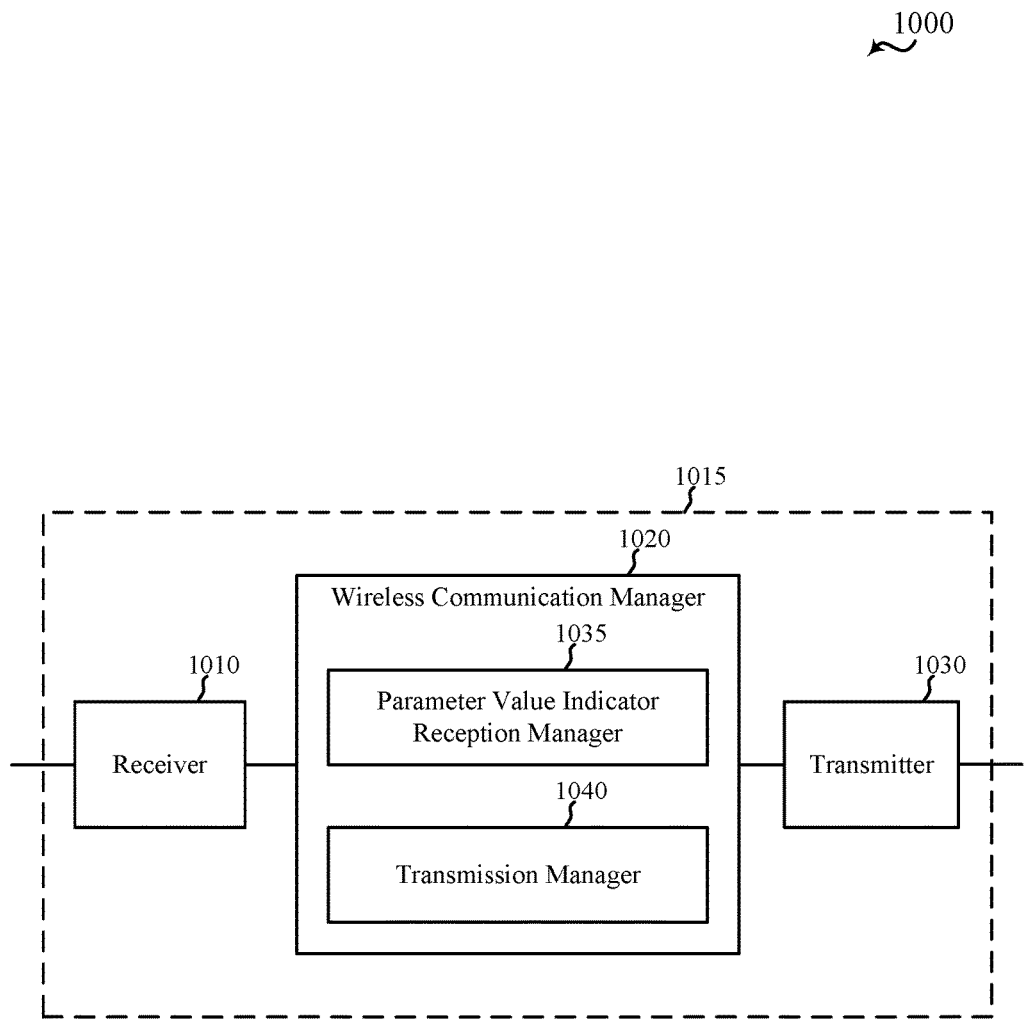
FIG. 10 shows a block diagram of an apparatus for use in wireless communication at a wireless communication device (e.g., an IOT device), in accordance with various aspects of the present disclosure.

FIG. 10 shows a block diagram 1000 of an apparatus 1015 for use in wireless communication at a wireless communication device (e.g., an IOT device), in accordance with various aspects of the present disclosure. The apparatus 1015 may be an example of aspects of one or more of the wireless communication devices 215 described with reference to FIG. 2, 3, 4, 5, 6, or 7. The apparatus 1015 may also be or include a processor. The apparatus 1015 may include a receiver 1010, a wireless communication manager 1020, or a transmitter 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over one or more spectrums. In some examples, the one or more spectrums may be used for Bluetooth, BLE, ZigBee, Wi-Fi, LTE-D, 5G, or unlicensed spectrum communications, as described, for example, with reference to FIGS. 1-7. The receiver 1010 may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter 1030 may include at least one RF transmitter, such as at least one RF transmitter operable to transmit over one or more spectrums. In some examples, the one or more spectrums may be used for Bluetooth, BLE, ZigBee, Wi-Fi, LTE-D, 5G, or unlicensed spectrum communications, as described, for example, with reference to FIGS. 1-7. The transmitter 1030 may be used to transmit various types of data or control signals (i.e., transmissions) over one or more communication links of a wireless communication system, such as one or more communication links of the wireless communication system 100 or 200 described with reference to FIG. 1 or 2.

In some examples, the wireless communication manager 1020 may be used to manage one or more aspects of wireless communication for the apparatus 1015. In some examples, part of the wireless communication manager 1020 may be incorporated into or shared with the receiver 1010 or the transmitter 1030. In some examples, the wireless communication manager 1020 may include a parameter value indicator reception manager 1035 or a transmission manager 1040.

The parameter value indicator reception manager 1035 may be used to receive, from a UE, an indicator of current values of time and location. In some examples, the indicator of the current values of time and location may include: the current values of time and location, or a HASH over the current values of time and location, or a combination thereof. In some examples, the receiving may occur on a wireless interface (e.g., a Bluetooth, BLE, ZigBee, Wi-Fi, LTE-D, 5G, or unlicensed spectrum interface).

The transmission manager 1040 may be used to transmit, to the UE, measurement data and an acknowledgement of the indicator of the current values of time and location. The measurement data may be acquired at a wireless communication device including the apparatus 1015, before or after the parameter value indicator reception manager 1035 receives the indicator of the current values of time and location from the UE. The measurement data and acknowledgement of the indicator of the current values of time and location may be transmitted together or separately. In some examples, the measurement data and acknowledgement of the indicator may be transmitted after the indicator of the current values of time and location is received. In some examples, the measurement data and acknowledgement of the indicator may be transmitted before the indicator of the current values of time and location is received. In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location. In some examples, the transmission manager 1040 may be used to transmit the measurement data and acknowledgement of the indicator of the current values of time and location on the wireless interface on which the indicator of the current values of time and location is received.

Figure 11:
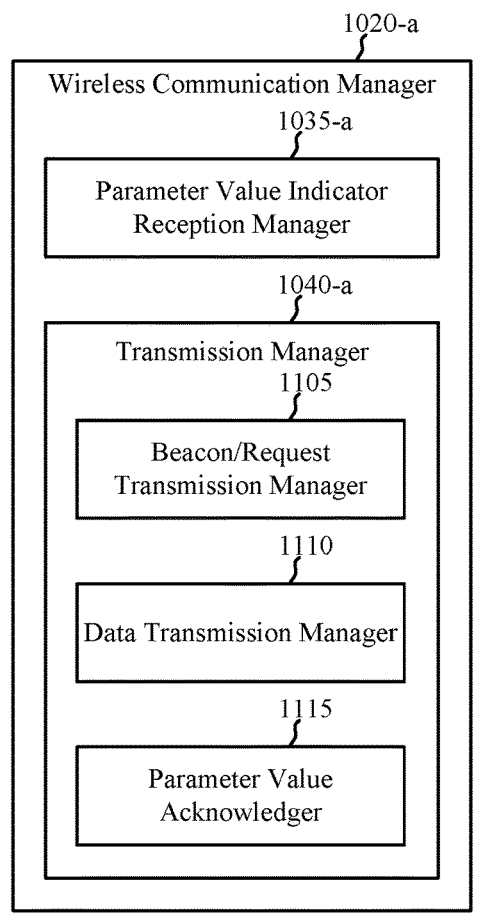
FIG. 11 shows a block diagram of a wireless communication manager for use in wireless communication at a wireless communication device (e.g., an IOT device), in accordance with various aspects of the present disclosure.

FIG. 11 shows a block diagram 1100 of a wireless communication manager 1020-*a* for use in wireless communication at a wireless communication device (e.g., an IOT device), in accordance with various aspects of the present disclosure. The wireless communication manager 1020-*a* may be an example of aspects of the wireless communication manager 1020 described with reference to FIG. 10.

The components of the wireless communication manager 1020-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1020-*a* may be used to manage one or more aspects of wireless communication for a wireless communication device or apparatus, such as one of the wireless communication devices 215 or the apparatus 1015 described with reference to FIG. 2, 3, 4, 5, 6, 7, or 10. In some examples, part of the wireless communication manager 1020-*a* may be incorporated into or shared with a receiver or a transmitter (e.g., the receiver 1010 or the transmitter 1030 described with reference to FIG. 10). In some examples, the wireless communication manager 1020-*a* may include a parameter value indicator reception manager 1035-*a* or a transmission manager 1040-*a*.

The parameter value indicator reception manager 1035-*a* may be used to receive, from a UE, an indicator of current values of time and location. In some examples, the indicator of the current values of time and location may include: the current values of time and location, or a HASH over the current values of time and location, or a combination thereof. In some examples, the receiving may occur on a wireless interface (e.g., a Bluetooth, BLE, ZigBee, Wi-Fi, LTE-D, 5G, or unlicensed spectrum interface).

The transmission manager 1040-*a* may include a beacon/request transmission manager 1105, a data transmission manager 1110, or a parameter value acknowledger 1115. The beacon/request transmission manager 1105 may be used to transmit a beacon or request. The request may include a request for: the current values of time and location, or relaying services, or a combination thereof. In some examples, the beacon or request may be transmitted on the wireless interface on which the indicator of the current values of time and location is received.

The data transmission manager 1110 may be used to transmit measurement data to the UE. The measurement data may be acquired at a wireless communication device including the wireless communication manager 1020-*a*, before or after the parameter value indicator reception manager 1035-*a* receives the indicator of the current values of time and location from the UE. In some examples, the measurement data be transmitted after the indicator of the current values of time and location is received by the parameter value indicator reception manager 1035-*a*. In some examples, the measurement data may be transmitted before the indicator of the current values of time and location is received by the parameter value indicator reception manager 1035-*a*. In some examples, measurement data may be transmitted before the indicator of the current values of time and location is received by the parameter value indicator reception manager 1035-*a*, and additional measurement data may be transmitted after the indicator of the current values of time and location is received by the parameter value indicator reception manager 1035-*a*. In some examples, the measurement data may include: a sensor reading, or an identity of the wireless communication device, or a combination thereof. In some examples, the data transmission manager 1110 may be used to transmit the measurement data on the wireless interface on which the indicator of the current values of time and location is received.

The parameter value acknowledger 1115 may be used to transmit, to the UE, an acknowledgement of the indicator of the current values of time and location. In some examples, the acknowledgement of the indicator of the current values of time and location may be transmitted together with the measurement data received by the data transmission manager 1110, after the indicator of the current values of time and location is received by the parameter value indicator reception manager 1035-*a*. In some examples, the acknowledgement of the indicator of the current values of time and location may be transmitted separately from the measurement data transmitted by the data transmission manager 1110, after the indicator of the current values of time and location is received by the parameter value indicator reception manager 1035-*a*. In some examples, the acknowledgement of the indicator of the current values of time and location may include: a binding of the indicator of the current values of time and location to the measurement data, or a signature of the indicator of the current values of time and location. In some examples, the parameter value acknowledger 1115 may transmit the acknowledgement of the indicator of the current values of time and location on the wireless interface on which the indicator of the current values of time and location is received.

In a system in which the measurement data and acknowledgement of the indicator of the current values of time and location are transmitted together, the functions of the data transmission manager 1110 and parameter value acknowledger 1115 may be provided by a data and parameter value acknowledgement transmission manager (not shown).

Figure 12:
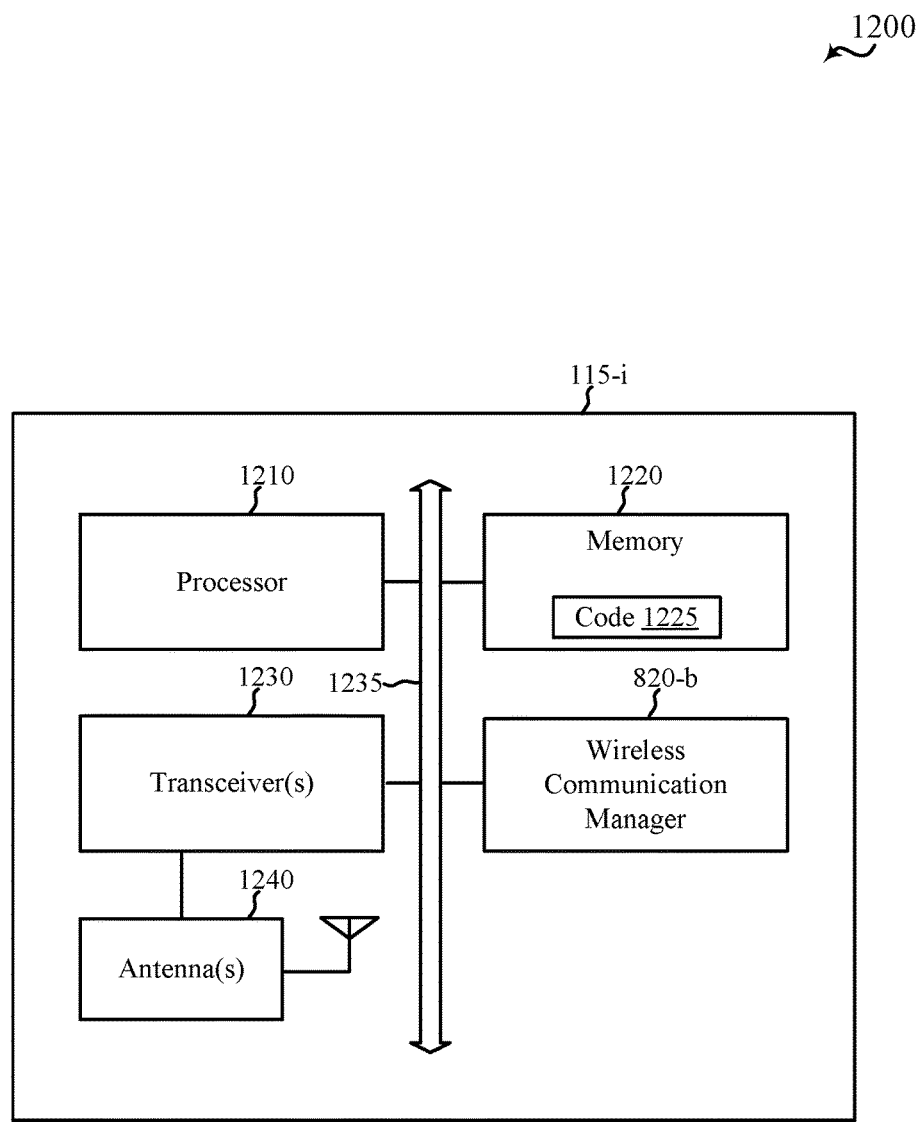
FIG. 12 shows a block diagram of a UE for use in wireless communication, in accordance with various aspects of the present disclosure.

FIG. 12 shows a block diagram 1200 of a UE 115-*i* for use in wireless communication, in accordance with various aspects of the present disclosure. The UE 115-*i* may be included in or be part of a cellular phone, a smart phone, a personal digital assistant (PDA), a wireless modem, a wireless communication device, a handheld device, a tablet computer, a laptop computer, a cordless phone, a wireless local loop (WLL) station, etc. The UE 115-*i* may, in some examples, have an internal power supply (not shown), such as a small battery, to facilitate mobile operation. In some examples, the UE 115-*i* may be an example of aspects of one or more of the UEs 115 described with reference to FIG. 1, 2, 3, 4, 5, 6, or 7, or aspects of the apparatus 805 described with reference to FIG. 8. The UE 115-*i* may be configured to implement at least some of the UE or apparatus techniques and functions described with reference to FIG. 1, 2, 3, 4, 5, 6, 7, 8, or 9.

The UE 115-*i* may include a processor 1210, a memory 1220, at least one transceiver (represented by transceiver(s) 1230), at least one antenna (represented by antenna(s) 1240), or a wireless communication manager 820-*b*. Each of these components may be in communication with each other, directly or indirectly, over one or more buses 1235.

The memory 1220 may include random access memory (RAM) or read-only memory (ROM). The memory 1220 may store computer-readable, computer-executable code 1225 containing instructions that are configured to, when executed, cause the processor 1210 to perform various functions described herein related to wireless communication, including, for example, transmitting, to a wireless communication device, an indicator of current values of time and location obtained by the UE 115-*i*; receiving, from the wireless communication device, measurement data acquired at the wireless communication device and an acknowledgement of the indicator of the current values of time and location; and forwarding the measurement data and the acknowledgement of the indicator of the current values of time and location to a data collector. Alternatively, the computer-executable code 1225 may not be directly executable by the processor 1210 but be configured to cause the UE 115-*i* (e.g., when compiled and executed) to perform various of the functions described herein.

The processor 1210 may include an intelligent hardware device, e.g., a central processing unit (CPU), a microcontroller, an ASIC, etc. The processor 1210 may process information received through the transceiver(s) 1230 or information to be sent to the transceiver(s) 1230 for transmission through the antenna(s) 1240. The processor 1210 may handle, alone or in connection with the wireless communication manager 820-*b*, various aspects of communicating over (or managing communications over) one or more spectrums using one or more radio access technologies.

The transceiver(s) 1230 may include at least one modem configured to modulate packets and provide the modulated packets to the antenna(s) 1240 for transmission, and to demodulate packets received from the antenna(s) 1240. The transceiver(s) 1230 may, in some examples, be implemented as one or more transmitters and one or more separate receivers. The transceiver(s) 1230 may support communications in one or more spectrums using one or more radio access technologies. The transceiver(s) 1230 may be configured to communicate bi-directionally, via the antenna(s) 1240, with one or more of the base stations 105 described with reference to FIG. 1 or 2, one or more of the WLAN access points 235 described with reference to FIG. 2, one or more of the network access devices 305 described with reference to FIGS. 3-7, or one or more of the wireless communication devices 215 or apparatuses 1015 described with reference to FIGS. 2-7, 10, and 11. While the UE 115-*i* may include a single antenna, there may be examples in which the UE 115-*i* may include multiple antennas.

The wireless communication manager 820-*b* may be configured to perform or control some or all of the UE or apparatus techniques or functions described with reference to FIG. 1, 2, 3, 4, 5, 6, 7, 8, or 9 related to wireless communication over one or more spectrums using one or more radio access technologies. The wireless communication manager 820-*b*, or portions of it, may include a processor, or some or all of the functions of the wireless communication manager 820-*b* may be performed by the processor 1210 or in connection with the processor 1210. In some examples, the wireless communication manager 820-*b* may be an example of aspects of the wireless communication manager 820 described with reference to FIG. 8 or 9.

Figure 13:
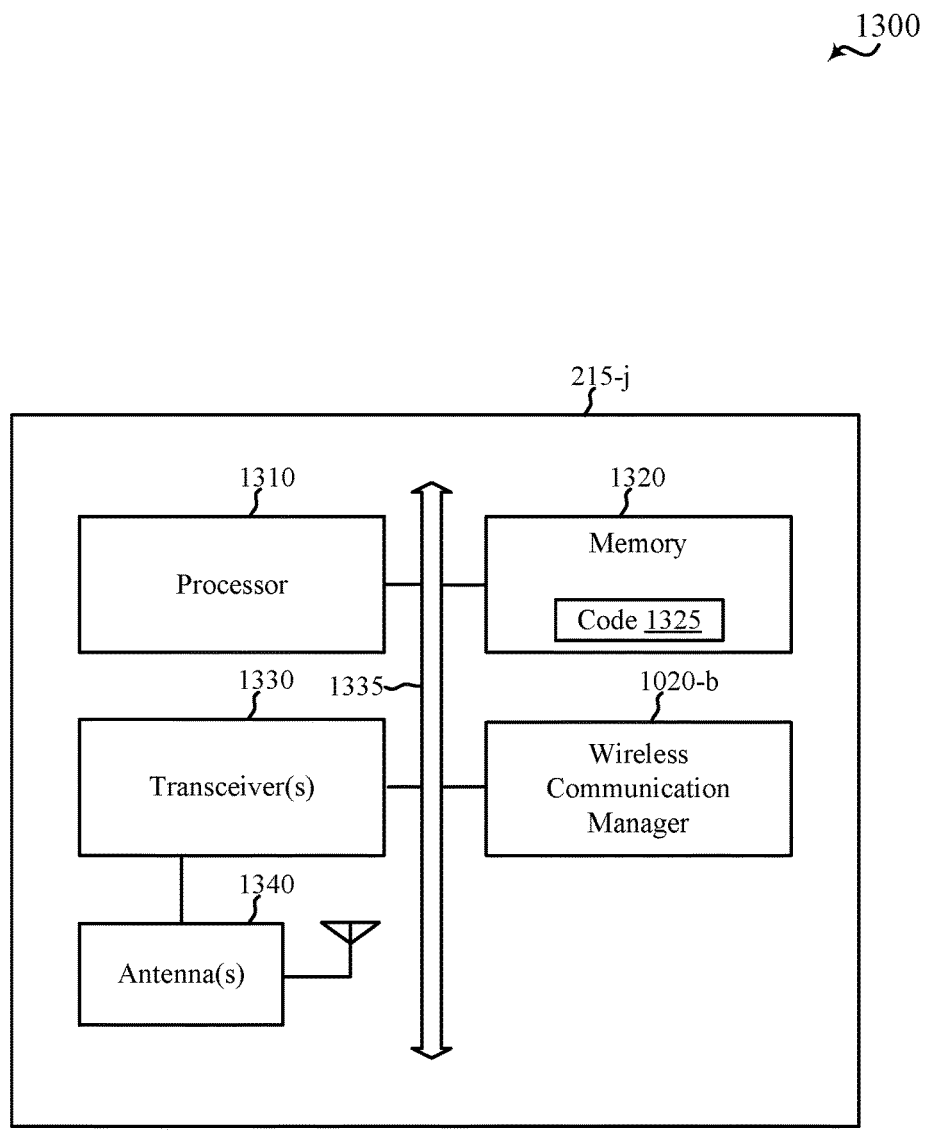
FIG. 13 shows a block diagram of a wireless communication device (e.g., an IOT device) for use in wireless communication, in accordance with various aspects of the present disclosure.

FIG. 13 shows a block diagram 1300 of a wireless communication device 215-*j* (e.g., an IOT device) for use in wireless communication, in accordance with various aspects of the present disclosure. The wireless communication device 215-*j* may be included in or be part of a wearable device (e.g., a watch or monitoring device), a tracking device, an ID tag, a household device, a monitoring device, etc. The wireless communication device 215-*j* may, in some examples, have an internal power supply (not shown), such as a small battery, to facilitate remote or mobile operation. In some examples, the wireless communication device 215-*j* may be an example of aspects of one or more of the wireless communication device 215 described with reference to FIG. 2, 3, 4, 5, 6, or 7, or aspects of the apparatus 1015 described with reference to FIG. 10. The wireless communication device 215-*j* may be configured to implement at least some of the wireless communication device or apparatus techniques and functions described with reference to FIG. 1, 2, 3, 4, 5, 6, 7, 10, or 11.

The wireless communication device 215-*j* may include a processor 1310, a memory 1320, at least one transceiver (represented by transceiver(s) 1330), at least one antenna (represented by antenna(s) 1340), or a wireless communication manager 1350. Each of these components may be in communication with each other, directly or indirectly, over one or more buses 1335.

The memory 1320 may include RAM or ROM. The memory 1320 may store computer-readable, computer-executable code 1325 containing instructions that are configured to, when executed, cause the processor 1310 to perform various functions described herein related to wireless communication, including, for example, receiving, from a UE, an indicator of current values of time and location; and transmitting, to the UE, measurement data and an acknowledgement of the indicator of the current values of time and location. Alternatively, the computer-executable code 1325 may not be directly executable by the processor 1310 but be configured to cause the wireless communication device 215-*j* (e.g., when compiled and executed) to perform various of the functions described herein.

The processor 1310 may include an intelligent hardware device, e.g., a CPU, a microcontroller, an ASIC, etc. The processor 1310 may process information received through the transceiver(s) 1330 or information to be sent to the transceiver(s) 1330 for transmission through the antenna(s) 1340. The processor 1310 may handle, alone or in connection with the wireless communication manager 1350, various aspects of communicating over (or managing communications over) one or more spectrums using one or more radio access technologies.

The transceiver(s) 1330 may include at least one modem configured to modulate packets and provide the modulated packets to the antenna(s) 1340 for transmission, and to demodulate packets received from the antenna(s) 1340. The transceiver(s) 1330 may, in some examples, be implemented as one or more transmitters and one or more separate receivers. The transceiver(s) 1330 may support communications in one or more spectrums using one or more radio access technologies. The transceiver(s) 1330 may be configured to communicate bi-directionally, via the antenna(s) 1340, with one or more of the UEs 115 or apparatuses 805 described with reference to FIGS. 1-9 and 12. While the wireless communication device 215-*j* may include a single antenna, there may be examples in which the wireless communication device 215-*j* may include multiple antennas.

The wireless communication manager 1350 may be configured to perform or control some or all of the wireless communication device or apparatus techniques or functions described with reference to FIG. 1, 2, 3, 4, 5, 6, 7, 10, or 11 related to wireless communication over one or more spectrums using one or more radio access technologies. The wireless communication manager 1350, or portions of it, may include a processor, or some or all of the functions of the wireless communication manager 1350 may be performed by the processor 1310 or in connection with the processor 1310. In some examples, the wireless communication manager 1350 may be an example of aspects of the wireless communication manager 1020 described with reference to FIG. 10 or 11.

Figure 14:
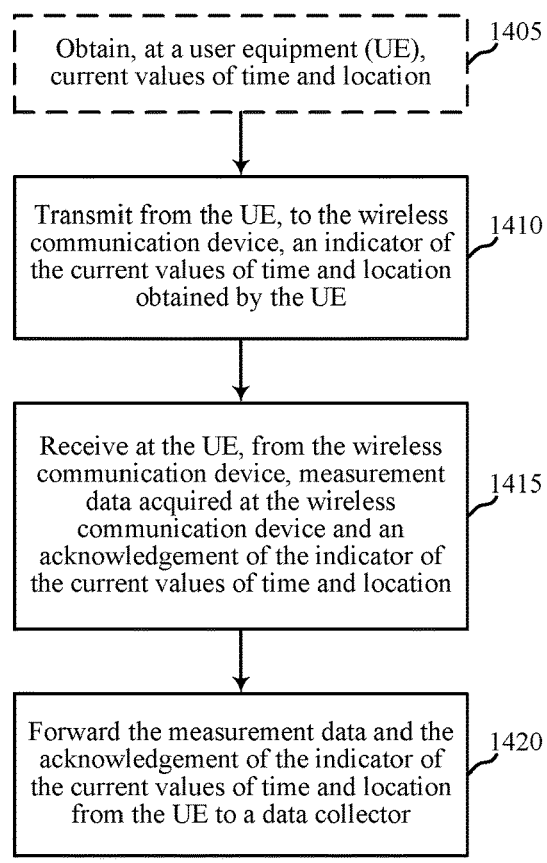
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs 115 described with reference to FIG. 1, 2, 3, 4, 5, 6, 7, or 12, aspects of the apparatus 815 described with reference to FIG. 8, or aspects of one or more of the wireless communication managers 820 described with reference to FIG. 8, 9, or 12. In some examples, a UE (or apparatus or wireless communication manager) may execute one or more sets of codes to control the functional elements of the UE to perform the functions described below. Additionally or alternatively, the UE may perform one or more of the functions described below using special-purpose hardware.

At block 1405, the method 1400 may optionally include obtaining, at a UE, current values of time and location. In some examples, the current values of time and location may be obtained from: a first sensor of the UE, or a second sensor remote from both the UE and a wireless communication device (e.g., an IOT device), or a combination thereof. The operation(s) at block 1405 may be performed using the wireless communication manager 820 described with reference to FIG. 8, 9, or 12, or the parameter value identifier 835 described with reference to FIG. 8 or 9.

At block 1410, the method 1400 may include transmitting from the UE, to the wireless communication device, an indicator of the current values of time and location obtained by the UE. In some examples, the indicator of the current values of time and location may include: the current values of time and location, or a HASH over the current values of time and location, or a combination thereof. In some examples, the transmitting may occur on a first wireless interface (e.g., a Bluetooth, BLE, ZigBee, Wi-Fi, LTE-D, 5G, or unlicensed spectrum interface). The operation(s) at block 1410 may be performed using the wireless communication manager 820 described with reference to FIG. 8, 9, or 12, or the parameter value indicator 840 described with reference to FIG. 8 or 9.

At block 1415, the method 1400 may include receiving at the UE, from the wireless communication device, measurement data acquired at the wireless communication device and an acknowledgement of the indicator of the current values of time and location. The measurement data and acknowledgement of the indicator of the current values of time and location may be received together or separately. In some examples, the measurement data and acknowledgement of the indicator may be received after the indicator of the current values of time and location is transmitted at block 1410. In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the receiving may occur on the first wireless interface. The operation(s) at block 1415 may be performed using the wireless communication manager 820 described with reference to FIG. 8, 9, or 12, the wireless communication device transmission reception manager 845 described with reference to FIG. 8 or 9, or the data reception manager 910 or parameter value acknowledgement reception manager 915 described with reference to FIG. 9.

At block 1420, the method 1400 may include forwarding the measurement data and the acknowledgement of the indicator of the current values of time and location from the UE to a data collector (e.g., a network data repository or application). In some examples, the forwarding may occur: upon receiving the acknowledgement of the indicator of the current values of time and location, or upon entering a service area for a network connected to the data collector, or at a time determined by the UE, or at a combination thereof. In some examples, the forwarding performed at block 1420 may further include forwarding, with the measurement data and the acknowledgement of the indicator of the current values of time and location, at least one of: the indicator of the current values of time and location, or the current values of time and location, or a second indicator of the current values of time and location. In some examples, the forwarding may occur on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface). The operation(s) at block 1420 may be performed using the wireless communication manager 820 described with reference to FIG. 8, 9, or 12, the information forwarding manager 850 described with reference to FIG. 8 or 9, or the network connectivity identifier 920 or information cache 925 described with reference to FIG. 9.

Figure 15:
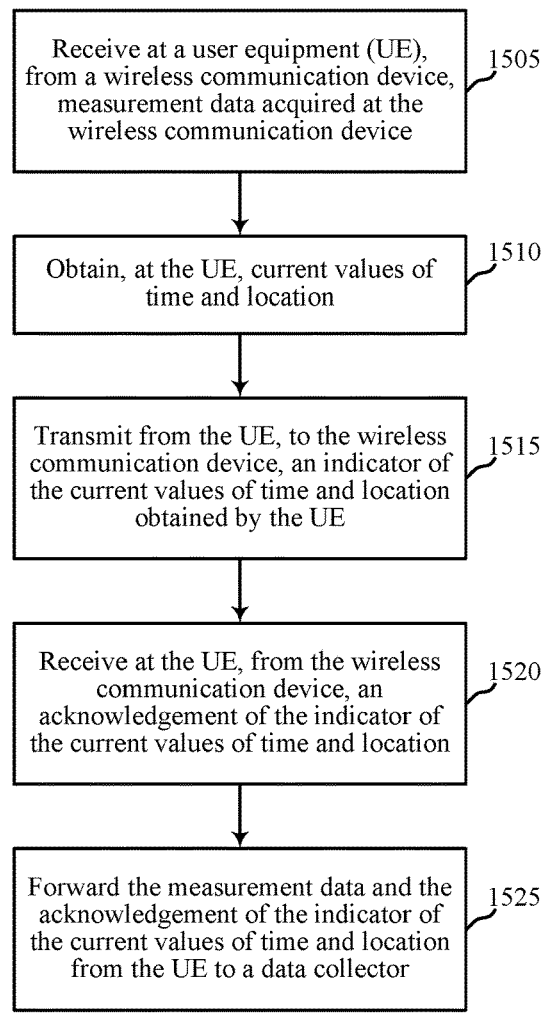
FIG. 15 is a flow chart illustrating an example of a method for wireless communication at a UE, in accordance with various aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs 115 described with reference to FIG. 1, 2, 3, 4, 5, 6, 7, or 12, aspects of the apparatus 815 described with reference to FIG. 8, or aspects of one or more of the wireless communication managers 820 described with reference to FIG. 8, 9, or 12. In some examples, a UE (or apparatus or wireless communication manager) may execute one or more sets of codes to control the functional elements of the UE to perform the functions described below. Additionally or alternatively, the UE may perform one or more of the functions described below using special-purpose hardware.

At block 1505, the method 1500 may include receiving at a UE, from a wireless communication device (e.g., an IOT device), measurement data acquired at the wireless communication device. In some examples, the measurement data may include: a sensor reading, or an identity of the wireless communication device, or a combination thereof. In some examples, the transmitting may occur on a first wireless interface (e.g., a Bluetooth, BLE, ZigBee, Wi-Fi, LTE-D, 5G, or unlicensed spectrum interface). The operation(s) at block 1505 may be performed using the wireless communication manager 820 described with reference to FIG. 8, 9, or 12, the wireless communication device transmission reception manager 845 described with reference to FIG. 8 or 9, or the data reception manager 910 described with reference to FIG. 9.

At block 1510, the method 1500 may include obtaining, at the UE, current values of time and location. In some examples, the current values of time and location may be obtained from: a first sensor of the UE, or a second sensor remote from both the UE and the wireless communication device, or a combination thereof. The operation(s) at block 1510 may be performed using the wireless communication manager 820 described with reference to FIG. 8, 9, or 12, or the parameter value identifier 835 described with reference to FIG. 8 or 9.

At block 1515, the method 1500 may include transmitting from the UE, to the wireless communication device, an indicator of the current values of time and location obtained by the UE. The indicator of the current values of time and location may be transmitted to the wireless communication device after the measurement data is received from the wireless communication device (at block 1505), and in some examples, the indicator of the current values of time and location may be transmitted based at least in part on receiving the measurement data from the wireless communication device (at block 1505). In some examples, the indicator of the current values of time and location may include: the current values of time and location, or a HASH over the current values of time and location, or a combination thereof. In some examples, the transmitting may occur on the first wireless interface. The operation(s) at block 1515 may be performed using the wireless communication manager 820 described with reference to FIG. 8, 9, or 12, or the parameter value indicator 840 described with reference to FIG. 8 or 9.

At block 1520, the method 1500 may include receiving at the UE, from the wireless communication device, an acknowledgement of the indicator of the current values of time and location. The acknowledgement of the indicator of the current values of time and location may be received from the wireless communication device after the indicator of the current values of time and location is transmitted to the wireless communication device (at block 1515). In some examples, the acknowledgement of the indicator of the current values of time and location may include: a binding of the indicator of the current values of time and location to the measurement data, or a signature of the indicator of the current values of time and location, or a combination thereof. In some examples, the receiving may occur on the first wireless interface. The operation(s) at block 1520 may be performed using the wireless communication manager 820 described with reference to FIG. 8, 9, or 12, the wireless communication device transmission reception manager 845 described with reference to FIG. 8 or 9, or the parameter value acknowledgement reception manager 915 described with reference to FIG. 9.

At block 1525, the method 1500 may include forwarding the measurement data and the acknowledgement of the indicator of the current values of time and location from the UE to a data collector (e.g., a network data repository or application). In some examples, the forwarding may occur: upon receiving the acknowledgement of the indicator of the current values of time and location, or upon entering a service area for a network connected to the data collector, or at a time determined by the UE, or at a combination thereof. In some examples, the forwarding performed at block 1525 may further include forwarding, with the measurement data and the acknowledgement of the indicator of the current values of time and location, at least one of: the indicator of the current values of time and location, or the current values of time and location, or a second indicator of the current values of time and location. In some examples, the forwarding may occur on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface). The operation(s) at block 1525 may be performed using the wireless communication manager 820 described with reference to FIG. 8, 9, or 12, the information forwarding manager 850 described with reference to FIG. 8 or 9, or the network connectivity identifier 920 or information cache 925 described with reference to FIG. 9.

Figure 16:
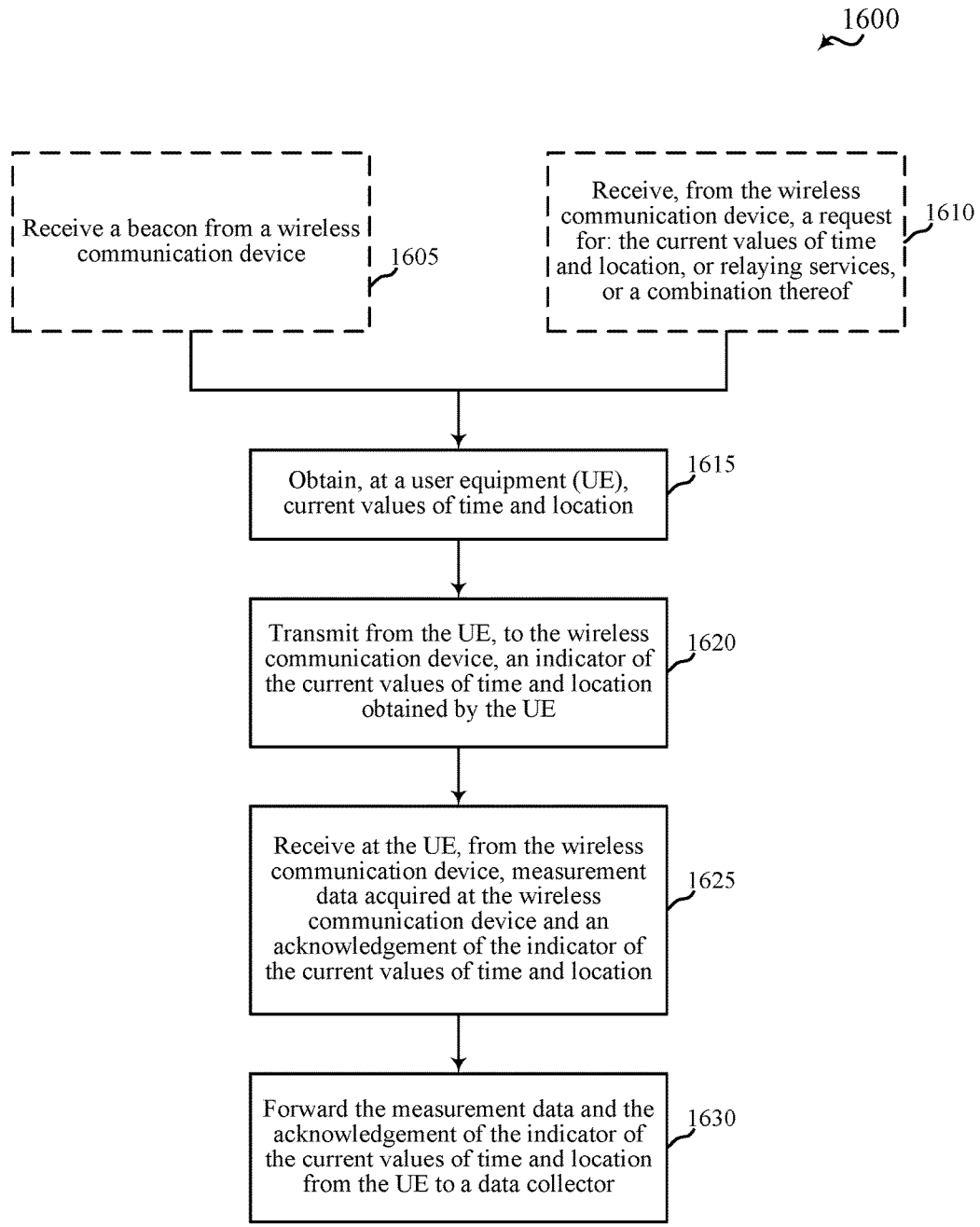
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115 described with reference to FIG. 1, 2, 3, 4, 5, 6, 7, or 12, aspects of the apparatus 815 described with reference to FIG. 8, or aspects of one or more of the wireless communication managers 820 described with reference to FIG. 8, 9, or 12. In some examples, a UE (or apparatus or wireless communication manager) may execute one or more sets of codes to control the functional elements of the UE to perform the functions described below. Additionally or alternatively, the UE may perform one or more of the functions described below using special-purpose hardware.

At block 1605, the method 1600 may optionally include receiving a beacon from a wireless communication device (e.g., an IOT device). In some examples, the receiving may occur on a first wireless interface (e.g., a Bluetooth, BLE, ZigBee, Wi-Fi, LTE-D, 5G, or unlicensed spectrum interface). The operation(s) at block 1605 may be performed using the wireless communication manager 820 described with reference to FIG. 8, 9, or 12, the wireless communication device transmission reception manager 845 described with reference to FIG. 8 or 9, or the beacon/request reception manager 905 described with reference to FIG. 9.

At block 1610, the method 1600 may optionally include receiving, from the wireless communication device, a request for: the current values of time and location, or relaying services, or a combination thereof. In some examples, the receiving may occur on the first wireless interface. The operation(s) at block 1610 may be performed using the wireless communication manager 820 described with reference to FIG. 8, 9, or 12, the wireless communication device transmission reception manager 845 described with reference to FIG. 8 or 9, or the beacon/request reception manager 905 described with reference to FIG. 9.

At block 1615, the method 1600 may include obtaining, at the UE, current values of time and location. In some examples, the current values of time and location may be obtained based at least in part on receiving the beacon (at block 1605) or receiving the request (at block 1610). In some examples, the current values of time and location may be obtained from: a first sensor of the UE, or a second sensor remote from both the UE and a wireless communication device, or a combination thereof. The operation(s) at block 1615 may be performed using the wireless communication manager 820 described with reference to FIG. 8, 9, or 12, or the parameter value identifier 835 described with reference to FIG. 8 or 9.

At block 1620, the method 1600 may include transmitting, to the wireless communication device, an indicator of the current values of time and location obtained by the UE. In some examples, the indicator of the current values of time and location may be transmitted based at least in part on receiving the beacon (at block 1605) or receiving the request (at block 1610). In some examples, the indicator of the current values of time and location may include: the current values of time and location, or a HASH over the current values of time and location, or a combination thereof. In some examples, the transmitting may occur on the first wireless interface. The operation(s) at block 1620 may be performed using the wireless communication manager 820 described with reference to FIG. 8, 9, or 12, or the parameter value indicator 840 described with reference to FIG. 8 or 9.

At block 1625, the method 1600 may include receiving, from the wireless communication device, measurement data acquired at the wireless communication device and an acknowledgement of the indicator of the current values of time and location. The measurement data and acknowledgement of the indicator of the current values of time and location may be received together or separately. In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location, or a combination thereof. In some examples, the receiving may occur on the first wireless interface. The operation(s) at block 1625 may be performed using the wireless communication manager 820 described with reference to FIG. 8, 9, or 12, the wireless communication device transmission reception manager 845 described with reference to FIG. 8 or 9, or the data reception manager 910 or parameter value acknowledgement reception manager 915 described with reference to FIG. 9.

At block 1630, the method 1600 may include forwarding the measurement data and the acknowledgement of the indicator of the current values of time and location to a data collector (e.g., a network data repository or application). In some examples, the forwarding may occur: upon receiving the acknowledgement of the indicator of the current values of time and location, or upon entering a service area for a network connected to the data collector, or at a time determined by the UE, or at a combination thereof. In some examples, the forwarding performed at block 1630 may further include forwarding, with the measurement data and the acknowledgement of the indicator of the current values of time and location, at least one of: the indicator of the current values of time and location, or the current values of time and location, or a second indicator of the current values of time and location. In some examples, the forwarding may occur on a second wireless interface (e.g., a cellular network interface (e.g., a 2.5G, 3G, 4G, LTE/LTE-A, 5G, CIOT, GPRS, EDGE, MTC, or eMTC interface) or a Wi-Fi interface). The operation(s) at block 1630 may be performed using the wireless communication manager 820 described with reference to FIG. 8, 9, or 12, the information forwarding manager 850 described with reference to FIG. 8 or 9, or the network connectivity identifier 920 or information cache 925 described with reference to FIG. 9.

Figure 17:
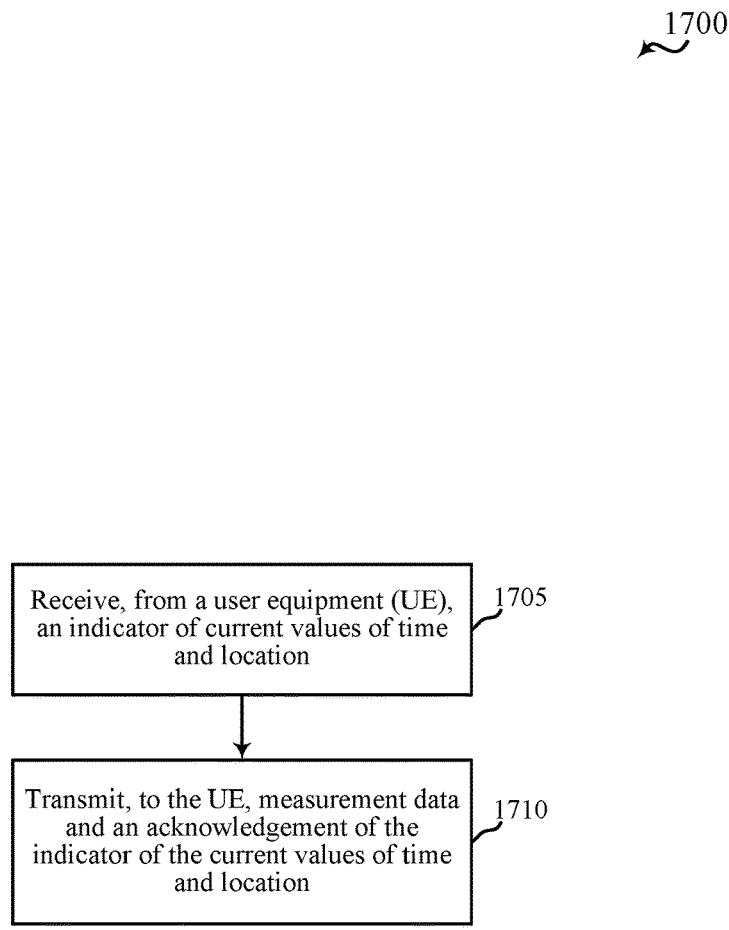
FIG. 17 is a flow chart illustrating an example of a method for wireless communication at a wireless communication device (e.g., an IOT device), in accordance with various aspects of the present disclosure.

FIG. 17 is a flow chart illustrating an example of a method 1700 for wireless communication at a wireless communication device (e.g., an IOT device), in accordance with various aspects of the present disclosure. For clarity, the method 1700 is described below with reference to aspects of one or more of the wireless communication devices 215 described with reference to FIG. 2, 3, 4, 5, 6, 7, or 13, aspects of the apparatus 1015 described with reference to FIG. 10, or aspects of one or more of the wireless communication managers 1020 described with reference to FIG. 10, 11, or 13. In some examples, a wireless communication device (or apparatus or wireless communication manager) may execute one or more sets of codes to control the functional elements of the wireless communication device to perform the functions described below. Additionally or alternatively, the wireless communication device may perform one or more of the functions described below using special-purpose hardware.

At block 1705, the method 1700 may include receiving, from a UE, an indicator of current values of time and location. In some examples, the indicator of the current values of time and location may include: the current values of time and location, or a HASH over the current values of time and location, or a combination thereof. In some examples, the receiving may occur on a wireless interface (e.g., a Bluetooth, BLE, ZigBee, Wi-Fi, LTE-D, 5G, or unlicensed spectrum interface). The operation(s) at block 1705 may be performed using the wireless communication manager 1020 described with reference to FIG. 10, 11, or 13, or the parameter value indicator reception manager 1035 described with reference to FIG. 10 or 11.

At block 1710, the method 1700 may include transmitting, to the UE, measurement data and an acknowledgement of the indicator of the current values of time and location. The measurement data may be acquired at the wireless communication device, before or after receiving the indicator of the current values of time and location from the UE (at block 1705). The measurement data and acknowledgement of the indicator of the current values of time and location may be transmitted together or separately. In some examples, the measurement data and acknowledgement of the indicator may be transmitted after the indicator of the current values of time and location is received (at block 1705). In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location. In some examples, the transmitting may occur on the wireless interface on which the indicator of the current values of time and location is received. The operation(s) at block 1710 may be performed using the wireless communication manager 1020 described with reference to FIG. 10, 11, or 13, the transmission manager 1040 described with reference to FIG. 10 or 11, or the data transmission manager 1110 or parameter value acknowledger 1115 described with reference to FIG. 11.

Figure 18:
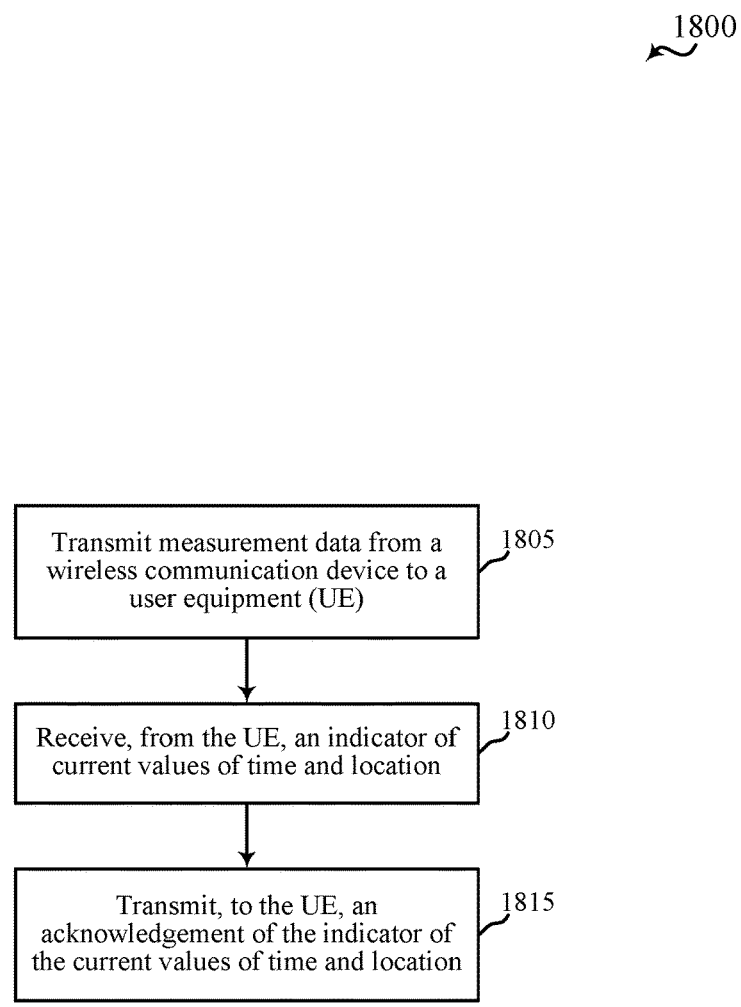
FIG. 18 is a flow chart illustrating an example of a method for wireless communication at a wireless communication device (e.g., an IOT device), in accordance with various aspects of the present disclosure.

FIG. 18 is a flow chart illustrating an example of a method 1800 for wireless communication at a wireless communication device (e.g., an IOT device), in accordance with various aspects of the present disclosure. For clarity, the method 1800 is described below with reference to aspects of one or more of the wireless communication devices 215 described with reference to FIG. 2, 3, 4, 5, 6, 7, or 13, aspects of the apparatus 1015 described with reference to FIG. 10, or aspects of one or more of the wireless communication managers 1020 described with reference to FIG. 10, 11, or 13. In some examples, a wireless communication device (or apparatus or wireless communication manager) may execute one or more sets of codes to control the functional elements of the wireless communication device to perform the functions described below. Additionally or alternatively, the wireless communication device may perform one or more of the functions described below using special-purpose hardware.

At block 1805, the method 1800 may include transmitting measurement data from a wireless communication device to a UE. In some examples, the measurement data may include: a sensor reading, or an identity of the wireless communication device, or a combination thereof. In some examples, the transmitting may occur on a wireless interface (e.g., a Bluetooth, BLE, ZigBee, Wi-Fi, LTE-D, 5G, or unlicensed spectrum interface). The operation(s) at block 1805 may be performed using the wireless communication manager 1020 described with reference to FIG. 10, 11, or 13, the transmission manager 1040 described with reference to FIG. 10 or 11, or the data transmission manager 1110 described with reference to FIG. 11.

At block 1810, the method 1800 may include receiving, from the UE, an indicator of current values of time and location. In some examples, the indicator of the current values of time and location may include: the current values of time and location, or a HASH over the current values of time and location, or a combination thereof. In some examples, the receiving may occur on the wireless interface on which the measurement data is transmitted. The operation(s) at block 1810 may be performed using the wireless communication manager 1020 described with reference to FIG. 10, 11, or 13, or the parameter value indicator reception manager 1035 described with reference to FIG. 10 or 11.

At block 1815, the method 1800 may include transmitting, to the UE, an acknowledgement of the indicator of the current values of time and location. The acknowledgement of the indicator may be transmitted after the indicator of the current values of time and location is received from the UE (at block 1810). In some examples, the acknowledgement of the indicator of the current values of time and location may include: a binding of the indicator of the current values of time and location to the measurement data, or a signature of the indicator of the current values of time and location. In some examples, the transmitting may occur on the wireless interface on which the measurement data is transmitted. The operation(s) at block 1815 may be performed using the wireless communication manager 1020 described with reference to FIG. 10, 11, or 13, the transmission manager 1040 described with reference to FIG. 10 or 11, or the parameter value acknowledger 1115 described with reference to FIG. 11.

Figure 19:
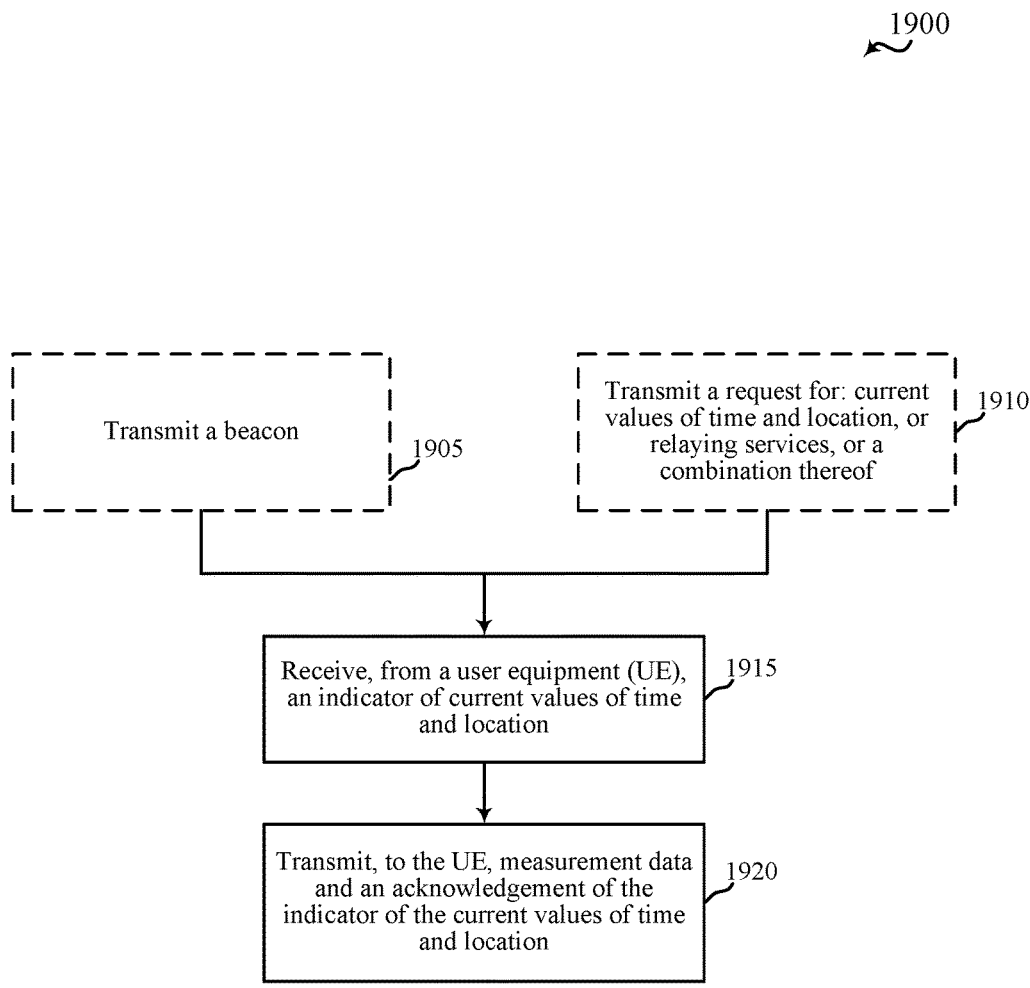
FIG. 19 is a flow chart illustrating an example of a method for wireless communication at a wireless communication device (e.g., an IOT device), in accordance with various aspects of the present disclosure.

FIG. 19 is a flow chart illustrating an example of a method 1900 for wireless communication at a wireless communication device (e.g., an IOT device), in accordance with various aspects of the present disclosure. For clarity, the method 1900 is described below with reference to aspects of one or more of the wireless communication devices 215 described with reference to FIG. 2, 3, 4, 5, 6, 7, or 13, aspects of the apparatus 1015 described with reference to FIG. 10, or aspects of one or more of the wireless communication managers 1020 described with reference to FIG. 10, 11, or 13. In some examples, a wireless communication device (or apparatus or wireless communication manager) may execute one or more sets of codes to control the functional elements of the wireless communication device to perform the functions described below. Additionally or alternatively, the wireless communication device may perform one or more of the functions described below using special-purpose hardware.

At block 1905, the method 1900 may include transmitting a beacon. In some examples, the transmitting may occur on a wireless interface (e.g., a Bluetooth, BLE, ZigBee, Wi-Fi, LTE-D, 5G, or unlicensed spectrum interface). The operation(s) at block 1905 may be performed using the wireless communication manager 1020 described with reference to FIG. 10, 11, or 13, the transmission manager 1040 described with reference to FIG. 10 or 11, or the beacon/request transmission manager 1105 described with reference to FIG. 11.

At block 1910, the method 1900 may optionally include transmitting a request for: current values of time and location, or relaying services, or a combination thereof. In some examples, the transmitting may occur on the wireless interface on which the beacon may be transmitted. The operation(s) at block 1910 may be performed using the wireless communication manager 1020 described with reference to FIG. 10, 11, or 13, the transmission manager 1040 described with reference to FIG. 10 or 11, or the beacon/request transmission manager 1105 described with reference to FIG. 11.

At block 1915, the method 1900 may include receiving, from a UE, an indicator of the current values of time and location. In some examples, the current values of time and location may be received based at least in part on transmitting the beacon (at block 1905) or transmitting the request (at block 1910). In some examples, the indicator of the current values of time and location may include: the current values of time and location, or a HASH over the current values of time and location, or a combination thereof. In some examples, the receiving may occur on the wireless interface on which the beacon or request is transmitted. The operation(s) at block 1915 may be performed using the wireless communication manager 1020 described with reference to FIG. 10, 11, or 13, or the parameter value indicator reception manager 1035 described with reference to FIG. 10 or 11.

At block 1920, the method 1900 may include transmitting, to the UE, measurement data and an acknowledgement of the indicator of the current values of time and location. The measurement data and acknowledgement of the indicator of the current values of time and location may be transmitted together or separately. The measurement data may be acquired at the wireless communication device, before or after receiving the indicator of the current values of time and location from the UE (at block 1915). In some examples, the measurement data may include: a sensor reading, or an identity of the wireless communication device, or a combination thereof. In some examples, the acknowledgement of the indicator of the current values of time and location may include: a binding of the indicator of the current values of time and location to the measurement data, or a signature of the indicator of the current values of time and location. In some examples, the transmitting may occur on the wireless interface on which the beacon or request is transmitted. The operation(s) at block 1920 may be performed using the wireless communication manager 1020 described with reference to FIG. 10, 11, or 13, the transmission manager 1040 described with reference to FIG. 10 or 11, or the data transmission manager 1110 or parameter value acknowledger 1115 described with reference to FIG. 11.

The methods 1400, 1500, 1600, 1700, 1800, and 1900 described with reference to FIGS. 14, 15, 16, 17, 18, and 19 may provide for wireless communication. It should be noted that the methods 1400, 1500, 1600, 1700, 1800, and 1900 are just example implementations, and the operations of the methods 1400, 1500, 1600, 1700, 1800, and 1900 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   transmitting, from the UE to a wireless communication device, an indicator of current values of time and location obtained by the UE;
   receiving, at the UE from the wireless communication device, measurement data acquired at the wireless communication device and an acknowledgement of the indicator of the current values of time and location; and
   forwarding the measurement data and the acknowledgement of the indicator of the current values of time and location to a data collector, wherein the data collector is distinct from the UE and the wireless communication device.

2. The method of claim 1, wherein the measurement data is received before the indicator of the current values of time and location is transmitted, and the acknowledgement of the indicator of the current values of time and location is received after the indicator of the current values of time and location is transmitted.

3. The method of claim 2, wherein the indicator of the current values of time and location is transmitted to the wireless communication device based at least in part on receiving the measurement data.

4. The method of claim 1, wherein the measurement data and the acknowledgement of the indicator of the current values of time and location are received after the indicator of the current values of time and location is transmitted.

5. The method of claim 1, wherein the indicator of the current values of time and location comprises:
   the current values of time and location, or a HASH over the current values of time and location, or a combination thereof.

6. The method of claim 1, wherein the acknowledgement of the indicator of the current values of time and location comprises:
   a binding of the indicator of the current values of time and location to the measurement data, or a signature of the indicator of the current values of time and location, or a combination thereof.

7. The method of claim 1, wherein the transmitting and receiving occurs on a first wireless interface and the forwarding occurs on a second wireless interface.

8. The method of claim 1, further comprising:
   receiving a beacon from the wireless communication device;
   wherein the indicator of the current values of time and location is transmitted based at least in part on receiving the beacon.

9. The method of claim 1, further comprising:
   receiving, from the wireless communication device, a request for: the current values of time and location, or relaying services, or a combination thereof;
   wherein the indicator of the current values of time and location is transmitted based at least in part on receiving the request.

10. The method of claim 1, wherein the forwarding further comprises:
    forwarding, with the measurement data and the acknowledgement of the indicator of the current values of time and location, at least one of: the indicator of the current values of time and location, or the current values of time and location, or a second indicator of the current values of time and location.

11. The method of claim 1, further comprising:
    obtaining the current values of time and location from: a first sensor of the UE, or a second sensor remote from both the UE and the wireless communication device, or a combination thereof.

12. The method of claim 1, wherein the forwarding occurs:
    upon receiving the acknowledgement of the indicator of the current values of time and location, or upon entering a service area for a network connected to the data collector, or at a time determined by the UE, or at a combination thereof.

13. The method of claim 1, wherein the measurement data comprises:
    a sensor reading, or an identity of the wireless communication device, or a combination thereof.

14. An apparatus for wireless communication at a user equipment (UE), comprising:
    means for transmitting, from the UE to a wireless communication device, an indicator of current values of time and location obtained by the UE;
    means for receiving, at the UE from the wireless communication device, measurement data acquired at the wireless communication device and an acknowledgement of the indicator of the current values of time and location; and
    means for forwarding the measurement data and the acknowledgement of the indicator of the current values of time and location to a data collector, wherein the data collector is distinct from the UE and the wireless communication device.

15. The apparatus of claim 14, wherein the measurement data is received before the indicator of the current values of time and location is transmitted, and the acknowledgement of the indicator of the current values of time and location is received after the indicator of the current values of time and location is transmitted.

16. The apparatus of claim 15, wherein the indicator of the current values of time and location is transmitted to the wireless communication device based at least in part on receiving the measurement data.

17. The apparatus of claim 14, wherein the measurement data and the acknowledgement of the indicator of the current values of time and location are received after the indicator of the current values of time and location is transmitted.

18. The apparatus of claim 14, wherein the indicator of the current values of time and location comprises:
the current values of time and location, or a HASH over the current values of time and location, or a combination thereof.

19. The apparatus of claim 14, wherein the acknowledgement of the indicator of the current values of time and location comprises:
a binding of the indicator of the current values of time and location to the measurement data, or a signature of the indicator of the current values of time and location, or a combination thereof.

20. The apparatus of claim 14, wherein the transmitting and receiving occurs on a first wireless interface and the forwarding occurs on a second wireless interface.

21. The apparatus of claim 14, further comprising:
means for receiving a beacon from the wireless communication device;
wherein the indicator of the current values of time and location is transmitted based at least in part on receiving the beacon.

22. The apparatus of claim 14, further comprising:
means for receiving, from the wireless communication device, a request for: the current values of time and location, or relaying services, or a combination thereof;
wherein the indicator of the current values of time and location is transmitted based at least in part on receiving the request.

23. The apparatus of claim 14, wherein the means for forwarding further comprises:
means for forwarding, with the measurement data and the acknowledgement of the indicator of the current values of time and location, at least one of: the indicator of the current values of time and location, or the current values of time and location, or a second indicator of the current values of time and location.

24. The apparatus of claim 14, further comprising:
means for obtaining the current values of time and location from: a first sensor of the UE, or a second sensor remote from both the UE and the wireless communication device, or a combination thereof.

25. The apparatus of claim 14, wherein the forwarding occurs:
upon receiving the acknowledgement of the indicator of the current values of time and location, or upon entering a service area for a network connected to the data collector, or at a time determined by the UE, or at a combination thereof.

26. The apparatus of claim 14, wherein the measurement data comprises:
a sensor reading, or an identity of the wireless communication device, or a combination thereof.

27. An apparatus for wireless communication at a user equipment (UE), comprising:
a processor; and
memory in electronic communication with the processor;
the processor and the memory configured to: transmit, from the UE to a wireless communication device, an indicator of current values of time and location obtained by the UE;
receive, at the UE from the wireless communication device, measurement data acquired at the wireless communication device and an acknowledgement of the indicator of the current values of time and location; and
forward the measurement data and the acknowledgement of the indicator of the current values of time and location to a data collector, wherein the data collector is distinct from the UE and the wireless communication device.

28. The apparatus of claim 27, wherein the indicator of the current values of time and location comprises:
the current values of time and location, or a HASH over the current values of time and location, or a combination thereof.

29. The apparatus of claim 27, wherein the acknowledgement of the indicator of the current values of time and location comprises:
a binding of the indicator of the current values of time and location to the measurement data, or a signature of the indicator of the current values of time and location, or a combination thereof.

30. The apparatus of claim 27, wherein the transmitting and receiving occurs on a first wireless interface and the forwarding occurs on a second wireless interface.

31. The apparatus of claim 27, wherein the processor and the memory are configured to:
receive a beacon from the wireless communication device;
wherein the indicator of the current values of time and location is transmitted based at least in part on receiving the beacon.

32. The apparatus of claim 27, wherein the processor and the memory are configured to:
receive, from the wireless communication device, a request for: the current values of time and location, or relaying services, or a combination thereof;
wherein the indicator of the current values of time and location is transmitted based at least in part on receiving the request.

33. The apparatus of claim 27, wherein the processor and the memory are configured to:
forward, with the measurement data and the acknowledgement of the indicator of the current values of time and location, at least one of: the indicator of the current values of time and location, or the current values of time and location, or a second indicator of the current values of time and location.

34. A non-transitory computer-readable medium storing computer-executable code for wireless communication at a user equipment (UE), the code executable by a processor to:
transmit, from the UE to a wireless communication device, an indicator of current values of time and location obtained by the UE;
receive, at the UE from the wireless communication device, measurement data acquired at the wireless communication device and an acknowledgement of the indicator of the current values of time and location; and
forward the measurement data and the acknowledgement of the indicator of the current values of time and location to a data collector, wherein the data collector is distinct from the UE and the wireless communication device.

35. The non-transitory computer-readable medium of claim 34, wherein the indicator of the current values of time and location comprises:

the current values of time and location, or a HASH over the current values of time and location, or a combination thereof.

36. The non-transitory computer-readable medium of claim 34, wherein the acknowledgement of the indicator of the current values of time and location comprises:
a binding of the indicator of the current values of time and location to the measurement data, or a signature of the indicator of the current values of time and location, or a combination thereof.

37. The non-transitory computer-readable medium of claim 34, wherein the code executable by the processor to forward the measurement data comprises code executable by the processor to:
forward, with the measurement data and the acknowledgement of the indicator of the current values of time and location, at least one of: the indicator of the current values of time and location, or the current values of time and location, or a second indicator of the current values of time and location.

38. A method for wireless communication at a wireless communication device, comprising:
receiving, from a user equipment (UE), an indicator of current values of time and location of the UE; and
transmitting, to the UE, measurement data and an acknowledgement of the indicator of the current values of time and location.

39. The method of claim 38, wherein the measurement data is transmitted before the indicator of the current values of time and location is received, and the acknowledgement of the indicator of the current values of time and location is transmitted after the indicator of the current values of time and location is received.

40. The method of claim 38, wherein the indicator of the current values of time and location comprises:
the current values of time and location, or a HASH over the current values of time and location, or a combination thereof.

41. The method of claim 38, wherein the acknowledgement of the indicator of the current values of time and location comprises:
a binding of the indicator of the current values of time and location to the measurement data, or a signature of the indicator of the current values of time and location.

42. An apparatus for wireless communication at a wireless communication device, comprising:
means for receiving, from a user equipment (UE), an indicator of current values of time and location of the UE; and
means for transmitting, to the UE, measurement data and an acknowledgement of the indicator of the current values of time and location.

43. The apparatus of claim 42, wherein the measurement data is transmitted before the indicator of the current values of time and location is received, and the acknowledgement of the indicator of the current values of time and location is transmitted after the indicator of the current values of time and location is received.

44. The apparatus of claim 42, wherein the indicator of the current values of time and location comprises:
the current values of time and location, or a HASH over the current values of time and location, or a combination thereof.

45. The apparatus of claim 42, wherein the acknowledgement of the indicator of the current values of time and location comprises:
a binding of the indicator of the current values of time and location to the measurement data, or a signature of the indicator of the current values of time and location.

46. An apparatus for wireless communication at a wireless communication device, comprising:
a processor; and
memory in electronic communication with the processor;
the processor and the memory configured to:
receive, from a user equipment (UE), an indicator of current values of time and location of the UE; and
transmit, to the UE, measurement data and an acknowledgement of the indicator of the current values of time and location.

47. The apparatus of claim 46, wherein the measurement data is transmitted before the indicator of the current values of time and location is received, and the acknowledgement of the indicator of the current values of time and location is transmitted after the indicator of the current values of time and location is received.

48. The apparatus of claim 46, wherein the acknowledgement of the indicator of the current values of time and location comprises:
a binding of the indicator of the current values of time and location to the measurement data, or a signature of the indicator of the current values of time and location.

49. A non-transitory computer-readable medium storing computer-executable code for wireless communication at a wireless communication device, the code executable by a processor to:
receive, from a user equipment (UE), an indicator of current values of time and location of the UE; and
transmit, to the UE, measurement data and an acknowledgement of the indicator of the current values of time and location.

50. The non-transitory computer-readable medium of claim 49, wherein the measurement data is transmitted before the indicator of the current values of time and location is received, and the acknowledgement of the indicator of the current values of time and location is transmitted after the indicator of the current values of time and location is received.

51. The non-transitory computer-readable medium of claim 49, wherein the acknowledgement of the indicator of the current values of time and location comprises:
a binding of the indicator of the current values of time and location to the measurement data, or a signature of the indicator of the current values of time and location.

* * * * *